US012792692B1

(12) United States Patent
Lumpkin et al.

(10) Patent No.: US 12,792,692 B1
(45) Date of Patent: Nov. 10, 2026

(54) MEMORY USAGE REDUCTION FOR DISPARATE DATA SOURCE AGGREGATION

(71) Applicant: The Huntington National Bank, Columbus, OH (US)

(72) Inventors: Robert Lumpkin, Columbus, OH (US); Jessica Pack, Columbus, OH (US); Fang Ji, Columbus, OH (US); Gregory A. McCracken, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/430,825

(22) Filed: Dec. 23, 2025

(51) Int. Cl.
*G06F 18/22* (2023.01)
*G06N 7/02* (2006.01)
*H04L 9/06* (2006.01)

(52) U.S. Cl.
CPC ............... *G06F 18/22* (2023.01); *G06N 7/02* (2013.01); *H04L 9/0643* (2013.01)

(58) Field of Classification Search
None
See application file for complete search history.

(56) References Cited

U.S. PATENT DOCUMENTS 9,269,028 B2 * 2/2016 Kurzer .............. G06F 16/90344
9,720,925 B1 * 8/2017 Lawson ................ G06F 40/194
10,691,753 B2 * 6/2020 Ogren ................. G06F 16/9024
2008/0282073 A1 * 11/2008 Cabot ....................... G06F 7/02
712/300

* cited by examiner

*Primary Examiner* — Yu Zhao
(74) *Attorney, Agent, or Firm* — Kilpatrick Townsend & Stockton LLP

(57) ABSTRACT

Techniques are described herein a system accesses undefined string objects from a first, externally generated data store and defined string objects from a distinct second data store. It calculates similarity scores between each undefined and defined string object using a first function, producing a first ordered array of similarity scores with a reduced memory footprint compared to the original undefined objects. A second function processes this array to form candidate pairs, resulting in a second ordered array with an even smaller memory footprint. For each candidate pair with a similarity score meeting a predetermined threshold, the system transforms the associated undefined string objects into new defined string objects based on the defined string objects. The second data store is then updated with these new defined string objects.

20 Claims, 8 Drawing Sheets

800

MEMORY USAGE REDUCTION FOR DISPARATE DATA SOURCE AGGREGATION

BACKGROUND

Some conventional computing systems increasingly rely on the ability to process, compare, and organize large volumes of data originating from a variety of independent and heterogeneous sources. As data is generated and stored in diverse formats and structures, the task of efficiently identifying relationships, similarities, or redundancies among data objects becomes progressively more complex. Traditional methods for comparing and reconciling data across separate repositories often encounter significant computational and memory constraints, especially as the size and complexity of datasets grow.

BRIEF SUMMARY

Techniques are provided for memory usage reduction for disparate data source aggregation. Various embodiments are described herein, including methods, systems, non-transitory computer-readable storage media storing programs, code, or instructions executable by one or more processors, and the like.

According to various embodiments, a computer-implemented method may include accessing undefined string objects from a first data store and defined string objects from a second data store, where the first data store may be generated by an external source and may differ from the second data store. The method may further include calculating similarity scores for each undefined string object and each defined string object by executing a first function on both sets of objects. A first ordered array may be generated based at least in part on the similarity scores, with the array containing each similarity score for each undefined string object and having a memory footprint smaller than that of the undefined string objects. A second ordered array may then be generated by executing a second function on the first ordered array to create sets of candidate pairs that include at least some of the undefined string objects, and this second ordered array may have a smaller memory footprint than the first. Each undefined string object in the sets of candidate pairs may be transformed into a set of new defined string objects for each similarity score that meets a predetermined threshold and is based at least in part on the defined string objects, and the second data store may be updated with the set of new defined string objects.

According to various embodiments, executing the first function may further involve determining an amount of the undefined string objects and applying at least one random permutation to the undefined string objects and the defined string objects in accordance with the amount. Generation of the first ordered array may be based at least in part on extracting at least one identifier associated with at least one value for each random permutation and populating the first ordered array with these identifiers and values.

According to various embodiments, the method may further include receiving images of objects associated with transferrable resources, where each image may have at least one user-defined string object, and the undefined string objects may be generated based at least in part on the at least one user-defined string object.

According to various embodiments, the method may further allow for the generation of a trained generative model by training a generative model based at least in part on the set of new defined string objects. New undefined string objects may be provided as input to the trained generative model, and an anomaly classification of the new undefined string objects may be received as output. Allocation of at least one transferrable resource from a first entity to a second entity may be controlled based at least in part on the anomaly classification.

According to various embodiments, the method may further enable receiving new undefined string objects, generating a comparison metric based at least in part on comparing the new undefined string objects to the set of new defined string objects, and controlling allocation of at least one transferrable resource from a first entity to a second entity based at least in part on the comparison metric.

According to various embodiments, executing the second function may further involve executing a fuzzy function on the first ordered array.

According to various embodiments, the first function may be a minhash function and the second function may be a locality sensitive hashing function.

BRIEF DESCRIPTION OF THE DRAWINGS

Various embodiments in accordance with the present disclosure will be described with reference to the drawings, in which.

Figure 1:
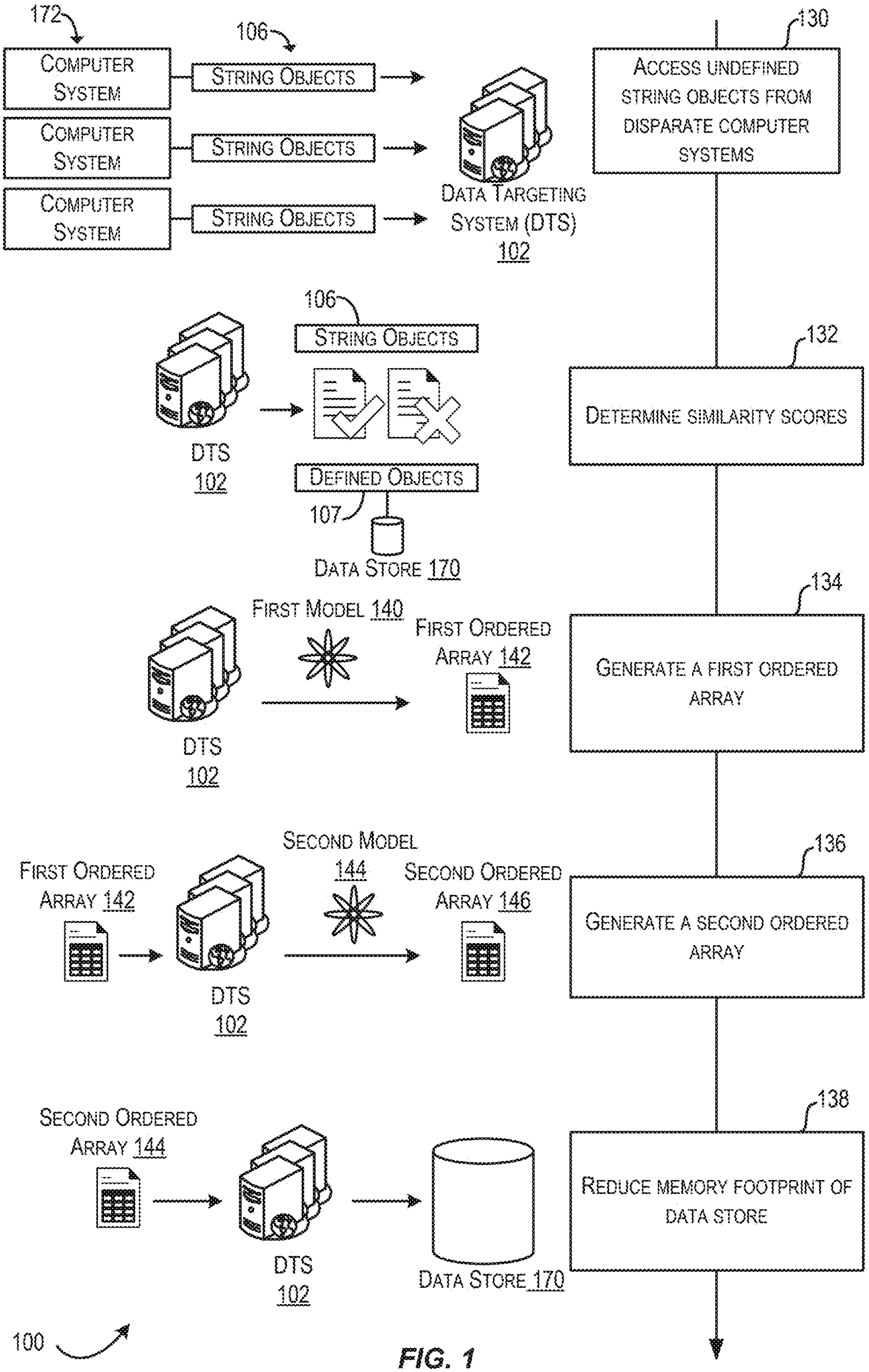
FIG. 1 is a simplified flow diagram of an example memory usage reduction process for aggregating undefined string objects from disparate data stores, according to certain embodiments.

The foregoing aspects and many of the advantages of the present disclosure will become more readily appreciated as these advantages become better understood by reference to the following detailed description, when taken in conjunction with the accompanying drawings.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions, and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Embodiments described herein are directed towards systems, processes, and methods for managing and updating large sets (e.g., thousands, millions, billions, trillions, etc. of bytes of data) of information that come from different sources and may be formatted in inconsistent ways. The process includes gathering many entries of data, each containing text descriptions about objects, such as the names of entities or identifiers associated with edge devices. In this context, a "string" refers to a sequence of letters, numbers, or characters, like "Hydroelectric Plant 4" or "Solar-.Panel.343" These entries, in various examples, may be created by users entering information, or maybe generated by applications that turn images (e.g., scanned objects or images) into text or embeddings. An "image" means any visual representation, such as a photograph or scanned paper, that is interpreted by a computer to pull out information. Once the system accesses the data entries, the system may determine which pieces of information are useful for a particular task and which pieces may be undesired. This determination is made by using various suitable models that may compare string objects for similarity. Systems herein use these instructions to compare new data entries to a list of standardized, known entries and organizes the results based on how alike they are. The systems, methods, and processes described herein may then reduce the size of the dataset by analyzing entries that are likely to match a standardized set, which may help save computer memory and processing time (e.g., a memory footprint). "Memory footprint" may refer to the amount of memory used to store and work with data/information. By modifying data in this way, the systems, methods, and processes may update records so that entries with random or inconsistent names are replaced with standardized names, preserving important information and removing undesired details.

Conventional systems for matching and reconciling data may have significant limitations when dealing with datasets (e.g., extremely large datasets of billions/trillions of string objects), especially those collected from multiple sources with varying formats, naming conventions, or data structures. Traditional techniques may often rely on brute-force comparisons, meaning that every possible pair of entries from two datasets may be examined. As the size of the datasets grows, the number of comparisons may increase rapidly. For example, matching 10,000 entries from one dataset with 500,000 entries from another may result in 5 billion individual comparisons, making the process slow and memory and processor resource-intensive. Many existing systems may use simple string matching, such as checking whether two names are exactly the same. These methods may fail when entries include typos, abbreviations, or minor spelling differences. Conventional devices generally may not have the capability to filter out irrelevant data fields or to standardize records efficiently, especially at large scale. As a result, these systems may tend to use excessive amounts of memory and processing power, leading to slow performance and the need for costly hardware upgrades. Additionally, when information is not text-based, such as images or handwritten signatures, conversion into text may be necessary before processing. Most traditional devices may not be equipped to handle this conversion quickly or to match the converted data with existing records in real time. Without filtering and matching processes, organizations may need to rely on manual review, which may be slow, costly, and prone to errors.

Moreover, training generative models (e.g., large language models (LLMs)) using datasets that are not carefully curated or targeted may lead to several significant issues that impact both the accuracy and efficiency of downstream applications. Generative models, such as those used in machine learning and artificial intelligence, learn patterns by analyzing vast amounts of information. When these datasets include excessive amounts of irrelevant or extraneous data, the generative models may struggle to distinguish useful data from background noise. Irrelevant data may introduce confusion during training, causing the generative model to learn patterns that do not actually relate to the intended task or domain. For example, if a model tasked with classifying entities is trained using a dataset that includes numerous unrelated fields, (e.g., random notes, formatting artifacts, or inconsistent naming conventions), the generative model may devote memory and computational resources to learning associations that are not meaningful for the targeted outcome. This can result in lower accuracy, increased error rates, and unreliable predictions. Excessive data that is not targeted may also lead to increased computational costs, both during training and inference. Larger, non-targeted datasets use more processor cycles, longer training times, and greater memory consumption. These inefficiencies may make it impractical to deploy generative models in real-world scenarios, especially when rapid or real-time decision-making is desired. In environments where hardware resources are limited, such inefficiencies may also lead to system slowdowns or failures. Furthermore, training with irrelevant information may make it difficult for generative models to generalize to new, unseen data. Instead of learning the most salient features of the domain, the generative model may overfit to noise or outliers present in the training data, reducing the usefulness and adaptability of the generative model when applied to practical problems.

The systems, methods, and processes described herein may bring substantial technical improvements in memory and processor efficiency. First, the original, large dataset may be transformed into a compact ordered array using similarity-preserving model such as minhash, keeping the information desired for matching and, in some examples, discarding undesired data early. The second memory reduction may occur when a second model is applied (e.g., locality sensitive hashing (LSH)), is applied to the ordered array, producing candidate pairs that are likely to be matches. By working only with these pairs, various embodiments herein may avoid storing or processing irrelevant data, further reducing the memory footprint. This staged reduction may handle datasets of any suitable size, including, for example, billions of entries, without overwhelming system resources. For example, an entity with billions of descriptors from different sources may start with a dataset occupying several petabytes of memory. After running the first and second models, the memory footprint of relevant data may be reduced, in some examples, to a range between hundreds of megabytes and hundreds of terabytes. In addition to memory footprint management, embodiments herein may improve hardware operations by optimizing processor use. The staged memory footprint reduction process may ensure that intensive calculations, such as those used for detailed string comparisons, are only performed on a subset of entries most likely to be matches. This targeted staged memory reduction may lower the overall number of operations, reduce processor strain, and/or speed up execution. By mitigating, or entirely eliminating, undesired comparisons, the system may reduce hardware wear and save energy. Organizations may process much larger datasets using their existing computers without having to purchase expensive new equipment.

Generative models that are trained on newly defined string object data may provide substantial improvements in training speed, memory usage, and generative model accuracy. When the training dataset includes standardized string objects that have been curated to remove irrelevant, extraneous, or inconsistent information, the generative model may process a smaller and more meaningful volume of data. This reduction in dataset size may result in shorter training times, as the generative model may perform fewer computations than would otherwise be devoted to analyzing unnecessary or noisy data fields. The memory footprint that is used to store and manipulate the curated training set may be minimized, which may allow the generative model to operate efficiently on hardware with limited resources and may facilitate the distribution of training tasks across multiple computing systems. By training the generative model on high-quality, relevant string object entries, the generative model may learn domain-specific patterns that are most pertinent to the intended task, resulting in trained generative models that are more accurate, reliable, and capable of generalizing to new or unseen data. Generative models trained in this manner may exhibit reduced error rates and increased interpretability, since the learned representations correspond closely to meaningful relationships in the application domain. In real-world deployments, such as cloud services, these technical improvements may enable faster inference, decreased resource consumption, and/or more consistent outputs, which may be particularly advantageous for applications demanding real-time or near-real-time results. Training the generative model on newly defined string object data may provide organizations with both improved computational efficiency and higher quality outputs to enhance the practical application and adaptability of generative models for various technical fields (e.g., chat bots).

FIG. 1 is a simplified flow diagram of an example memory usage reduction process 100 for aggregating undefined string objects from disparate data stores, according to certain embodiments. The discussion below describes a process for organizing and updating large collections of information that may be stored across different computer systems or databases. Data may be collected from many sources, even if the information is stored in different formats or locations. The process then uses various suitable models to compare and sort the data, identifying which entries are most relevant or similar to a set of standard definitions. By narrowing down the information to relevant entries, systems, methods, and processes described herein can improve data stores, control aspects of edge devices, and provide improved training to generative models. Moreover, the following process may reduce an amount of computer memory needed and makes it easier to access and work with the data in the future when used to make decisions, train generative models, and/or control aspects of devices.

At block 130, the memory usage reduction process 100 may include accessing undefined string objects 106 from disparate computer systems 172 (or data stores). By way of a non-limiting example, each of the disparate computer systems 172 may be a different data store (e.g., database, cloud-based server, etc.) that stores, tracks, or otherwise has access to the undefined string objects 106. Each of the computer systems 172 may be in communication with a data targeting system (DTS) 102 so that the DTS 102 can access the undefined string objects 106. Accessing undefined string objects 106 from disparate computer systems 172 may involve interfacing with multiple types of data stores, such as relational databases or cloud-based servers, each of which may organize data in unique formats. The DTS 102 may initiate data retrieval operations over a network, using standard communication protocols, in order to gather undefined string objects 106 from each computer system 172. As these undefined string objects 106 may be distributed across separate platforms, the DTS 102 may implement, in some examples, compatibility routines to attempt to normalize incoming data. This initial aggregation step may ensure that the data targeting system 102 has comprehensive access to all relevant string objects, regardless of the specific data architecture employed by each computer system 172. Centralizing undefined string objects 106 within the DTS 102 may lay the foundation for subsequent memory usage reduction steps.

At block 132, the memory usage reduction process 100 may include determining similarity scores. By way of a non-limiting example, the DTS 102 may access defined string objects 107 and calculate similarity scores (or suitable equivalent), using a first model 140, between the defined string objects 107 and the undefined string objects 106. This may include applying a minhash function to the undefined string objects 106 against the defined string objects 107. Determining similarity scores between defined string objects 107 and undefined string objects 106 may involve comparing the content and structure of each string object using the first model 140, which may be implemented as a minhash function or another similarity estimation algorithm. The minhash function may efficiently process large sets of string objects by summarizing their features into compact signatures, which may make it feasible to estimate similarity without exhaustive pairwise comparison. By calculating similarity scores, the DTS 102 may identify which undefined string objects 106 are most closely related to the standardized definitions found in defined string objects 107. This process may facilitate the identification of candidate matches for further refinement. The use of the first model 140 in this manner may be particularly effective for handling datasets containing non-uniform or noisy string objects.

At block 134, the memory usage reduction process 100 may include generating a first ordered array. By way of a non-limiting example, the DTS 102 may use the first model 140 to generate the first ordered arrays. Generating a first ordered array 142 may involve organizing the similarity scores produced by the first model 140 into a structured format (e.g., a matrix or list). In some examples, the first ordered array 142 may represent a reduced form of the original dataset containing data for subsequent analysis. This reduction may be accomplished by filtering out low-similarity entries, retaining only those string objects that have a meaningful relationship to the defined string objects 107. By structuring the data into the first ordered array 142, the DTS 102 may prepare for further narrowing of the dataset, which may contribute to improved memory management and faster processing times. The first ordered array 142 may serve as a starting point for applying more refined matching techniques in subsequent steps.

At block 136, the memory usage reduction process 100 may include generating a second ordered array 146. By way of a non-limiting example, the second ordered array 146 may be generated using a second model (e.g., a locality sensitive hashing (LSH) model) that is applied to the first ordered array 142. Generating a second ordered array 146 may be accomplished by applying a second model 144, such as the LSH, to the first ordered array 142. The LSH model may further compress the dataset by grouping string objects into candidate pairs based on a similarity, which may be determined according to pre-set thresholds. The second ordered array 146 may contain only those entries that are highly likely to match defined string objects 107, mitigating and/or eliminating a need to retain or process less relevant data. This step may represent a second stage of memory footprint reduction, focusing computational resources on the most promising candidates. Using the second model 144 may allow the DTS 102 to efficiently manage large-scale datasets with minimal resource consumption.

At block 138, the memory usage reduction process 100 may include reducing a memory footprint of a data store 170. By way of a non-limiting example, the second ordered array (e.g., second model 144) may be in a format in accordance with the defined string objects 107 and no longer includes some or all arbitrary and/or data store specific entries. Reducing the memory footprint of a data store 170 may be achieved by updating the format and contents of the data store to align with the standardized definitions found in defined string objects 107. The second ordered array may replace arbitrary or data store-specific entries with standardized string objects, removing undesired or redundant information. This may result in a more compact and consistent dataset within the data store 170, which may improve both storage efficiency and accessibility of the data store 170. The process may involve deleting outdated records, merging duplicate entries, and/or reformatting data fields to conform to a common schema or defined table structure.

Figure 2:
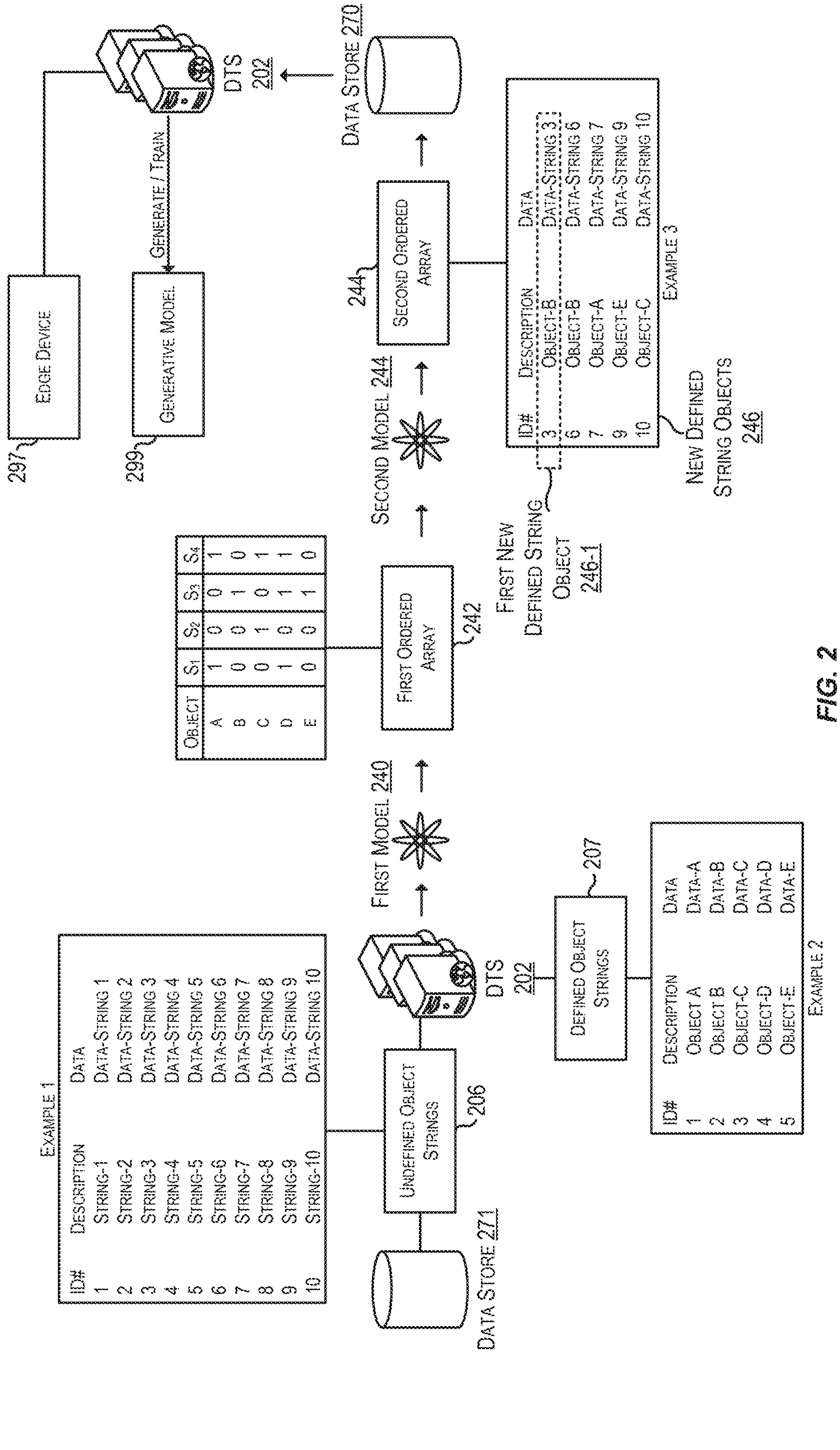
FIG. 2 is a simplified block diagram of example system that implements a memory usage reduction process for aggregating undefined string objects from disparate data stores, according to certain embodiments.

FIG. 2 is a simplified block diagram of example system 200 that implements a memory usage reduction process for aggregating undefined string objects from disparate data stores, according to certain embodiments. By way of a non-limiting example, data store 271 may serve as an external repository that provides undefined object strings 206 to a DTS 202. Data store 271 may be implemented as a remote database, a cloud-based file repository, or a local server, each offering access to undefined object strings 206 that may include information sourced from disparate environments (e.g., undefined object strings 206 extracted from scanned laboratory notebooks, undefined object strings 206 generated from sensor logs in an industrial setting, or undefined object strings 206 collected from digital image metadata). For example, data store 271 may represent any external repository or source of information that is capable of providing undefined object strings 206 to a DTS 202 (which is an example of the DTS 102 with respect to FIG. 1).

Data store 271 may include, but is not limited to, remote databases, cloud-based storage platforms, distributed file systems, local servers, network-attached storage devices, or third-party application servers. In some examples, data store 271 may be implemented using relational database management systems (e.g., SQL databases), NoSQL databases (e.g., document or key-value stores), and/or object storage solutions (e.g., cloud buckets). Data store 271 may also encompass sources such as electronic document management systems, digital archives, data lakes, or repositories used for storing sensor-generated data. Access to data store 271 may be facilitated through various communication protocols, including but not limited to, RESTful APIs, database connectors, secure file transfer mechanisms, or direct network connections. In various embodiments, data store 271 may be implemented as an edge device, including but not limited to, a smart phone, tablet, desktop computer, laptop, wearable device, sensor module, or other endpoint computing system. In some examples, data store 271 may transmit undefined object strings 206 generated or captured by the edge device. For example, the data store 271 may collect undefined object strings 206 from sources such as user input, application logs, sensor measurements, digital photographs, audio recordings, and/or scanned documents. Communication between data store 271 and the DTS 202 may occur over wireless or wired connections, including Wi-Fi, Bluetooth, cellular networks, Ethernet, or direct USB interfaces. Data store 271 may transmit undefined object strings 206 to the data targeting system 202 either continuously, at scheduled intervals, or in response to specific events or triggers.

As described previously with respect to FIG. 1, the DTS 202 may access defined object strings 207, which may reside within a data store 270 (or data store 271 in some examples). The defined object strings 207 may represent standardized, validated, or reference entries that have undergone prior normalization or verification (e.g., defined object strings 207 containing approved taxonomic labels in a biological database, defined object strings 207 including validated part numbers in an engineering inventory, or defined object strings 207 listing canonical terms in a scientific repository). The defined object strings 207 may be generated using a validation process that utilizes a generative model 299, or in some examples, a collection of generative models operating in parallel or in sequence (e.g., jury). For example, the generative model 299 may receive object strings as input and may analyze each object string for consistency, accuracy, and conformity to a set of reference patterns or domain-specific rules. In some examples, the generative model 299 may be trained to recognize anomalies, outliers, or inconsistencies by comparing the object strings to previously validated entries. A collection of generative models may operate as a jury, with each generative model contributing an independent evaluation or score. The aggregate results may be used to determine whether an object string is accepted, flagged for review, or rejected. The validation process may include steps such as detecting typographical errors, verifying format compliance, assessing semantic relevance, or confirming alignment with standardized terminology. Output from the generative model 299, or the ensemble of generative models, may be used to update data store 270, annotate existing defined object strings 207 with validation status, and/or trigger additional review and correction workflows.

According to various embodiments, when undefined object strings 206 are received by the DTS 202, the DTS 202 may employ a first model 240 (e.g., a first function), which may be a minhash function or another similarity estimation algorithm, to compare each undefined object string 206 with the defined object strings 207. This process may involve analyzing character sequences, token patterns, or word groupings to generate similarity scores (e.g., comparing different spellings of mineral names from field reports to a standardized geologic glossary, evaluating handwritten device labels from maintenance logs against a verified equipment registry, or matching variable experimental codes from research records to a master list of study identifiers). The similarity scores produced by the first model 240 may be organized into a first ordered array 242. The first ordered array 242 may provide a structured representation, such as a matrix (e.g., signature matrix) or list, that captures relationships between undefined object strings 206 and defined object strings 207. This organization may facilitate efficient filtering, retaining string objects with significant similarity (e.g., filtering out annotation tags that do not closely match a vocabulary, isolating sensor readings that align with predefined activity types, selecting only those research entries that correspond to established study names, etc.).

In examples where a minhash function is used as a similarity estimation algorithm to efficiently compare sets of data, such as undefined object strings 206 and defined object strings 207, the minhash function may process each string object by first converting the string into a set of smaller components, such as words, tokens, or character shingles. For each set derived from a string object, the minhash function may apply a series of hash functions or randomized permutations, selecting the minimum hash value from each permutation to form the minhash signature of the set. These signatures may be compared across string objects, with the probability that two string objects share the same minhash value indicating the degree of similarity between the underlying sets. For example, two undefined object strings 206: "blue hummingbird" and "hummingbird blue", each string may be tokenized into the set {blue, hummingbird}. The minhash function may apply a hash function to each token, generating hash values such as {5, 9} for "blue" and {9, 5} for "hummingbird," depending on the permutation order. For one permutation, the minimum hash value may be 5 for both sets. For another permutation, the minimum may be 9. If the minhash signatures match across several permutations, the strings are considered highly similar. By using minhash signatures, the data targeting system 202 may quickly estimate the similarity between various numbers of string objects without, in some examples, performing exhaustive pairwise comparisons (e.g., using Jaccard similarity algorithms). The minhash function may be especially effective for handling large-scale, noisy, or non-uniform datasets, where traditional exact matching algorithms would be computationally prohibitive. The resulting similarity scores may be stored in a first ordered array 242, serving as the basis for subsequent refinement and candidate selection steps using additional models.

In certain embodiments, executing the first model 240 (e.g., a first function) may include determining the amount of the subset of undefined string objects and applying at least one random permutation to both the subset of undefined string objects and the subset of defined string objects. Each random permutation may rearrange the elements or components of the string objects, such as characters, tokens, or shingles, to generate diverse hash values or signature representations. For each random permutation, the system may extract at least one identifier associated with at least one value (e.g., a minimum hash value, permutation index, or signature component) corresponding to each string object. The first ordered array 242 may then be populated with the extracted identifiers and values for some or all permutations, resulting in a matrix or list that encodes the similarity relationships between the subsets.

In examples where a LSH function is used as a the second model 244 to identify pairs of string objects that exhibit a high degree of similarity, the LSH may operate by dividing the minhash signatures, which represent the features of undefined object strings 206 and defined object strings 207, into multiple segments called bands. For each band, LSH may apply a hash function that maps the segment to a bucket. String objects whose minhash signatures fall into the same bucket for at least one band are considered candidate pairs and are likely to be similar. For example, suppose the minhash signatures for two string objects are represented as a series of numbers: [7, 2, 5, 9, 3, 1]. LSH may divide this series into three bands, each containing two numbers: Band 1 [7, 2], Band 2 [5, 9], Band 3 [3, 1]. Each band may be hashed into buckets, such as Band 1: Bucket A, Band 2: Bucket C, Band 3: Bucket B. If another string object produces the same hash for Band 2, both objects may be grouped together as candidate pairs for further analysis, even if their overall signatures are not identical. LSH may reduce the computational burden by narrowing a focus to candidate pairs, rather than comparing every possible combination of string objects. This may allow the DTS 202 to efficiently filter the first ordered array 242 and produce a second ordered array 244 containing only highly probable matches.

The DTS 202 may apply a second model 244 (e.g., second function), such as a LSH model, to the first ordered array 242. The second model 244 may further compress the data, identifying candidate pairs that meet a predetermined similarity threshold and are highly likely to be accurate matches (e.g., grouping similar chemical compound names for cross-referencing in a scientific database, clustering related device event descriptions in a monitoring network, or pairing analogous file annotations in a digital archive). The results of the second model 244 may be stored in a second ordered array 244, which may contain new defined string objects 246. Each new defined string object 246 may be a composite entry that incorporates standardized information from a defined object string 207 (overwriting the previous domain-specific descriptor) and relevant details from the corresponding undefined object string 206 (e.g., combining a standardized species name with location-specific field notes, merging a validated equipment identifier with recorded sensor measurements, or associating a canonical experimental term with unique procedural details from laboratory records).

In some examples, newly defined string objects 246 may provide a standardized dataset for generation and training of a generative model 299. These newly defined string objects 246 may result from the process in which arbitrary and/or inconsistent data is transformed into entries that conform to a common schema, containing both standardized descriptors and context-specific information preserved from the original sources. In some examples, newly defined string objects 246 may include technical attributes, metadata, timestamps, sensor readings, text annotations, or other domain-relevant details. To generate and train the generative model 299, the data targeting system 202 may aggregate newly defined string objects 246 along with additional data from data store 270, defined object strings 207, or any other validated source. The training dataset may include labeled data, where each entry in the dataset includes an explicit label or outcome associated with the input features (e.g., newly defined string objects 246 annotated with categories such as "valid," "error," or "outlier"), and unlabeled data, where only the input features are available and the generative model 299 may be configured to discover patterns or relationships without predefined categories (e.g., newly defined string objects 246 containing unclassified signal data, images, or text entries).

The generative model 299 may be trained to learn patterns, correlations, and/or structures that are specific to technical domain represented in the newly defined string objects 246 and defined object strings 207. Training may involve supervised learning, in which the generative model 299 is exposed to labeled examples and learns to associate feature patterns with known outcomes (e.g., training the generative model 299 to recognize types of sensor events based on labeled data entries). The generative model 299 may also be trained using unsupervised or semi-supervised learning methods, which may enable the generative model 299 to identify clusters, anomalies, or latent features in the dataset when labeled data is limited or unavailable (e.g., discovering new groupings of measurements or detecting unexpected patterns in technical logs). The source of defined object strings 207 may be selected to ensure that the generative model 299 acquires data that is relevant and useful for the intended technical application. By training the generative model 299 using entries that have been validated for consistency, accuracy, and/or domain relevance, the generative model 299 may achieve improved performance, more precise classification, and/or greater generalizability to new or unseen data. The training process may include steps to filter, clean, and/or normalize input data.

Once the generative model 299 has been trained, the trained generative model may be deployed to any suitable number of systems, including servers, cloud platforms, edge devices, distributed computing nodes, and/or embedded controllers. Deployment may be accomplished through direct installation, network provisioning, or containerization, depending on the infrastructure requirements and operational constraints. The trained generative model may be used to perform real-time classification, anomaly detection, pattern recognition, or predictive analytics on incoming data streams, and may be integrated into automated workflows or decision-support tools. In some examples, multiple instances of the trained generative model may be deployed in parallel across a distributed network (e.g., network 616 with respect to FIG. 6), providing localized inference and analysis capabilities. In addition, or alternatively, the trained generative model 299 may be hosted in a centralized environment, serving as a component of a cloud-hosted system responsible for data analysis, monitoring, or content generation.

The DTS 202 may receive new undefined string objects and systematically generate a comparison metric by analyzing the relationship between these new undefined string objects and the set of new defined string objects 246. The comparison metric may be determined through use of the first model 240, the second model 244, or any other suitable comparison metric (e.g., similarity thresholds) that evaluate attributes such as textual similarity, metadata correspondence, and/or contextual relevance. In some embodiments, the DTS 202 may use threshold values, scoring algorithms, and/or ranking mechanisms to assess whether the new undefined string objects closely match the standardized entries included in the new defined string objects 246. This process may facilitate automated classification, prioritization, or validation of incoming data, ensuring that only high-quality and relevant entries are considered for further processing.

Based on the outcome of the comparison metric, the DTS 202 may control allocation of at least one transferrable resource from a first entity to a second entity via a first edge device to a second edge device. This allocation may encompass adjustments such as granting or denying access privileges, assigning digital assets, provisioning computational resources, or enabling specific system functionalities. The decision to allocate resources may be triggered automatically when the comparison metric indicates a sufficient degree of similarity or alignment between the new undefined string objects and the new defined string objects 246.

Example 1: New Defined String Object Generation

In a non-limiting example, a large amount of research institutions deploy hundreds or thousands of environmental sensors around the globe to monitor weather patterns, atmospheric conditions, and ecological changes that produce data entries a few times a day each. Over several years, these sensors generate a petabyte of raw observational data, including text logs, sensor readings, metadata entries, and annotation files. Each institution stores data in its own format, using a variety of external sources such as cloud repositories, distributed file systems, and edge devices. Data store 271 in this scenario may represent the external repositories at each institution, including cloud buckets holding sensor logs, local servers archiving field notes, edge devices such as weather stations, and portable tablets used by researchers in remote areas. Each data store 271 provides undefined object strings 206 to the DTS 202 for further processing (e.g., undefined object strings 206 may include raw sensor readings like "temp: 21.5 C, loc: Amazon_River, time: 2023-05-04T12:03", scanned field notes, or unstructured annotation files from edge devices).

The DTS 202 serves as the aggregation and normalization hub. The DTS 202 may receive the undefined object strings 206 from each data store 271, regardless of the underlying format or data architecture. The DTS 202 may also has access to a curated repository of standardized environmental descriptors, stored as defined object strings 207 in data store 270. Defined object strings 207 may include validated sensor types, standard location identifiers, approved measurement units, and standardized terminology (e.g., defined object strings 207: "Temperature Sensor Model X", "Amazon River Basin", "Celsius", "Barometric Pressure", "Relative Humidity"). Upon receiving the influx of undefined object strings 206, the DTS 202 initiates the first step in data reduction using the first model 240. The first model 240 may be a minhash function configured to tokenize and convert each undefined object string 206 into a set of key features (e.g., breaking down "temp: 21.5 C, loc: Amazon_River" into tokens such as "temp", "21.5 C", "Amazon_River"). The minhash function applies multiple hash permutations to these token sets, generating compact minhash signatures for each entry. For example, "Amazon_River" and "Amazon River Basin" may yield similar signatures if their token overlap is high.

These minhash signatures may be organized into a first ordered array 242, which may be a matrix listing similarity scores between each undefined object string 206 and each defined object string 207. The first ordered array 242 filters out entries with low similarity, retaining only those where the undefined object strings 206 closely match the standardized descriptors in defined object strings 207. For instance, sensor logs labeled "Amazon_River" with temperature readings may be matched to the defined object string 207 "Amazon River Basin", while ambiguous or unrelated entries may be discarded. The DTS 202 may apply a second model 244, such as a LSH, to the first ordered array 242. The LSH may divide the minhash signatures into bands and hashes each band into buckets, grouping together candidate pairs that fall into the same bucket in at least one band. For example, all temperature sensor readings from the Amazon region, regardless of minor spelling differences or formatting inconsistencies, may be grouped as candidate pairs if the minhash signatures align in a band. The output may be a second ordered array 244 including highly probable matches. In this example, the second ordered array 244 may include new defined string objects 246 that merge the standardized descriptors from defined object strings 207 with relevant, context-specific data from the original undefined object strings 206. For instance, a new defined string object 246 may combine "Temperature Sensor Model X" from defined object strings 207 with the precise reading and timestamp from the undefined object string 206 ("21.5 C, 2023-05-04T 12:03"), producing a unified standardized entry.

With the candidate pairs identified, the DTS 202 uses the new defined string objects 246 to update data store 270, replacing arbitrary or inconsistent records with standardized entries. Redundant, outdated, or non-standard entries are removed or merged, resulting in a compact, clean dataset that preserves all relevant observations and scientific details. The original petabyte of heterogeneous data may now be reduced to a few gigabytes of highly usable, standardized data, ready for analysis and sharing across the consortium. Additionally, the DTS 202 may use the curated and standardized contents of data store 270, including the new defined string objects 246, to generate and train a generative model 299. The generative model 299 may be designed to classify sensor events, detect anomalies in environmental readings, or predict future atmospheric trends. Because the generative model 299 is trained only on high-quality, standardized data, it may learn domain-specific patterns, providing accurate and reliable predictions for scientific research (e.g., training the generative model 299 to detect unusual temperature spikes in the Amazon region, classify humidity trends by location, or predict rainfall based on validated sensor data).

Example 2: Generative Model Generation and Training

Continuing the previous non-limiting example, the DTS 202 has completed the process of aggregating, normalizing, and/or reducing data from a petabyte of raw environmental sensor entries to a highly curated dataset of a few gigabytes, the process may continue using generative model 299. For example, the standardized and context-rich new defined string objects 246, now stored within data store 270, may include entries such as "Temperature Sensor Model X," "21.5 C," "Amazon River Basin," "2023-05-04T12:03," and other relevant details extracted from the original sensor logs and metadata. To prepare for generative model training, the DTS 202 may select both labeled and unlabeled data from data store 270. Labeled data may include new defined string objects 246 annotated with known outcomes, such as "normal reading," "equipment malfunction," or "anomaly detected." Unlabeled data may consist of records where only sensor measurements and metadata are present, leaving the generative model 299 to infer underlying patterns or groupings.

For example, the DTS 202 may assemble a training dataset where thousands of temperature readings from standardized entries are labeled according to external ground truth (e.g., "normal" readings based on historical climate data, "anomalous" readings flagged by expert review, or "maintenance needed" based on sensor diagnostics). Unlabeled sensor logs may be included to allow generative model 299 to discover new event types, unexpected trends, or correlations that have not yet been categorized. The generative model 299 may be configured for supervised learning, unsupervised learning, or semi-supervised learning, depending on the desired use of the generative model 2999. During supervised training, the generative model 299 may learn to classify sensor events, such as distinguishing between ordinary temperature fluctuations and heatwaves, by analyzing labeled new defined string objects 246. During unsupervised or semi-supervised training, the generative model 299 may cluster humidity readings by location, identify rare weather phenomena, or detect latent variables across different measurement types, using both labeled and unlabeled standardized entries.

Throughout the training process, the DTS 202 may use defined object strings 207 as the source for domain-specific features, ensuring that the generative model 299 learns from validated sensor types, approved measurement units, and canonical location identifiers. For example, the generative model 299 may incorporate knowledge about "Barometric Pressure" and "Relative Humidity" from defined object strings 207 to improve prediction accuracy for atmospheric events. Once the generative model 299 has been trained on the curated dataset of new defined string objects 246 and defined object strings 207, the resulting trained generative model may be deployed to any suitable number of systems. Deployment may include installation on cloud infrastructure for large-scale batch analysis, edge devices such as weather stations for real-time event classification, or distributed computing platforms for localized inference at remote research sites. For example, the trained generative model may be embedded in weather stations to instantly classify sensor readings as "normal" or "anomalous," may operate in cloud-based analytics engines to predict rainfall patterns based on validated sensor data, or may run on portable tablets used by researchers to provide immediate feedback on field measurements. The trained generative model 299 may operate continuously, at scheduled intervals, or in response to specific events, supporting automated workflows such as anomaly detection, trend prediction, and/or sensor calibration advisories. The generative model 299 may integrate with alerting systems to notify entities of unusual temperature spikes, may trigger maintenance routines for equipment showing abnormal readings, or may provide predictive insights into atmospheric trends. The generative model 299 may generalize to new sensor deployments, environmental conditions, and research standards, offering technical solutions for automated data analysis and decision support for the research institutions.

Figure 3:
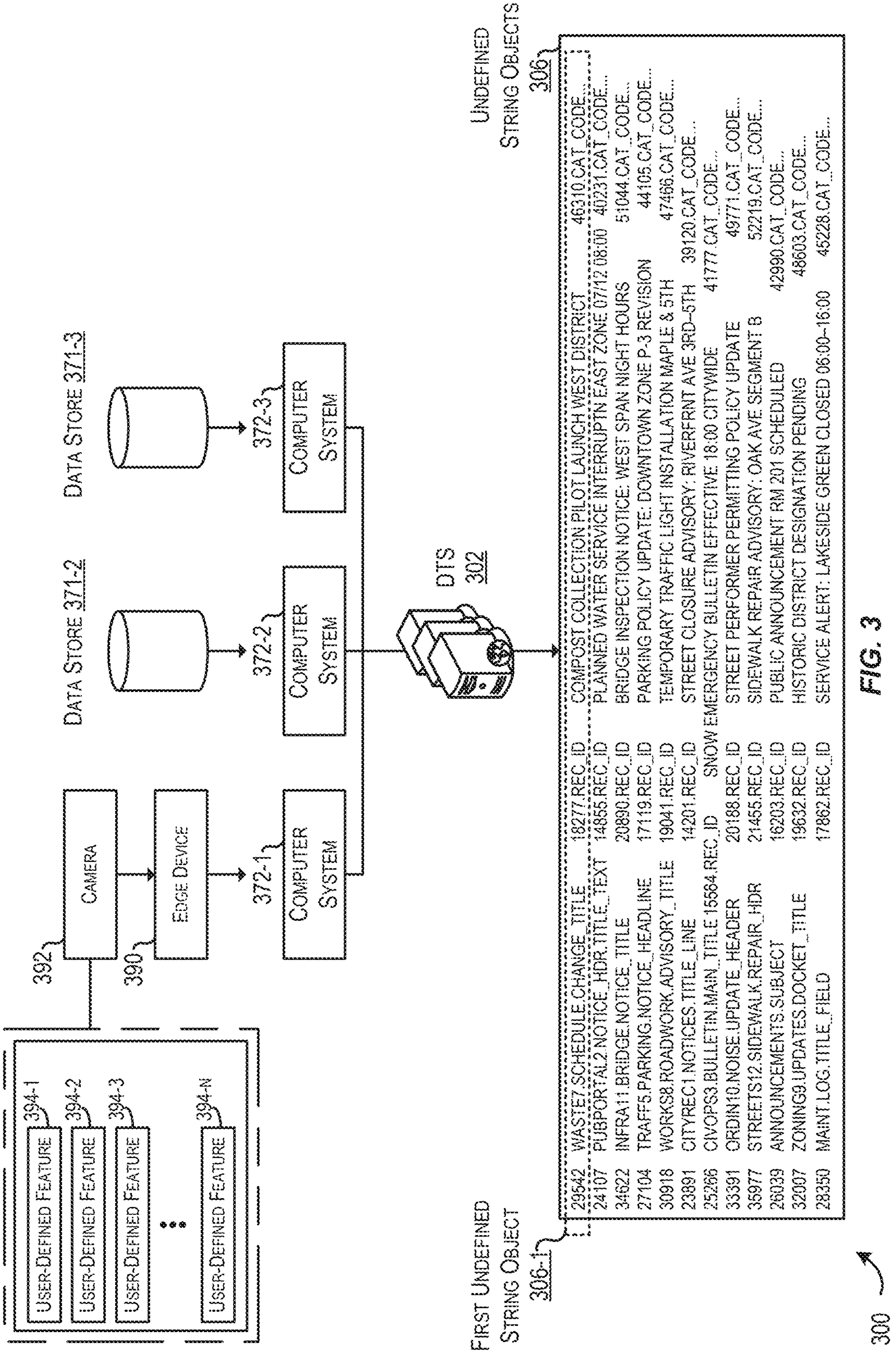
FIG. 3 is a simplified block diagram of example process for populating undefined string objects, according to certain embodiments.

FIG. 3 is a simplified block diagram of example process 300 for populating undefined string objects, according to certain embodiments. By way of a non-limiting example, user-defined features 394 may be captured by entities using an edge device 390 equipped with a camera 392. User-defined features 394 may include images, video frames, or other visual data, or, in some examples, may also include digital representations or embeddings derived from these images. For example, user-defined features 394 may include photographs of handwritten notes, signatures, environmental scenes, or technical diagrams, as well as feature vectors representing specific patterns detected within those images. The camera 392 of edge device 390 may facilitate the initial capture of these features, while onboard processing may generate embeddings or preliminary metadata associated with each capture. The edge device 390 may communicate with computer system 372-1, which may receive user-defined features 394 either as raw visual data or as pre-processed embeddings. Computer system 372-1 may perform additional processing to convert the user-defined features 394 into undefined string objects 306. This conversion may involve techniques such as optical character recognition for text extraction, image-to-text translation, or feature encoding that transforms non-textual data into standardized string representations. For example, a photograph of a technical label may be converted into a string such as "Sensor Model A, Serial 012345," or an embedding of an environmental scene may be represented as a descriptive string object.

A second computer system 372-2 may be coupled to a data store 371-2, which may serve as an external source of structured or unstructured data. Data store 371-2 may contain large datasets, such as historical archives, bulk data logs, or third-party repositories. Computer system 372-2 may extract data from data store 371-2, convert the relevant entries into undefined string objects 306, and prepare the undefined string objects 306 for aggregation. For instance, data store 371-2 may provide batches of annotated images, sensor measurements, or archival documents, all of which are translated into undefined string objects 306 by computer system 372-2. A third computer system 372-3 may be coupled to a data store 371-3, which is configured to gather and store real-time data. Data store 371-3 may receive streaming inputs from live sensors, monitoring devices, or other real-time sources, such as audio feeds or machine telemetry. Computer system 372-3 may process these data streams by converting them into undefined string objects 306, ensuring that each real-time entry is standardized and compatible with the aggregation workflow. For example, a real-time temperature reading with associated location and timestamp may be formatted as an undefined string object 306, ready for further analysis as described in more detail with respect to FIG. 4.

Some or all undefined string objects 306, whether originating from user-defined features 394, external data store 371-2, or real-time data store 371-3, may be transmitted to the DTS 302. The DTS 302 may serve as the central aggregator, collecting undefined string objects 306 from multiple computer systems 372 and diverse data sources. The collected undefined string objects 306 may then be subjected to further normalization, similarity analysis, and memory reduction processes as previously described, supporting the transformation of heterogeneous data into a standardized, efficient format suitable for subsequent technical operations.

Figure 4:
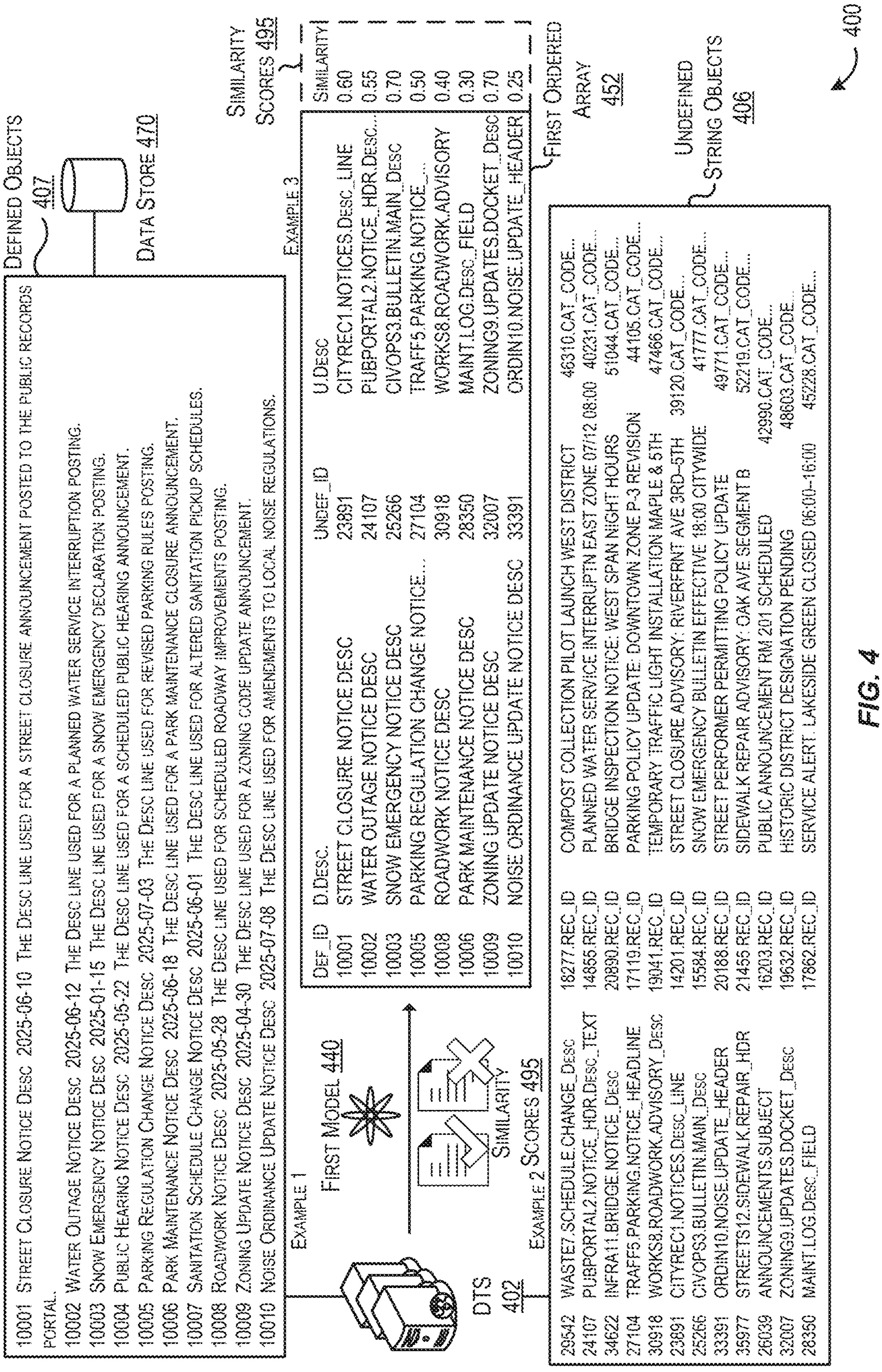
FIG. 4 is a simplified block diagram of example process for generating a first ordered array, according to certain embodiments.

FIG. 4 is a simplified block diagram of example process 400 for generating a first ordered array, according to certain embodiments. By way of a non-limiting example, defined objects 407 may be retrieved from data store 470 and provided to a DTS 402 (which is an example of DTS 202 with respect to FIG. 2) for use in a string object matching and standardization process. Defined objects 407 may represent validated, standardized entries that describe specific categories of public notices, such as, for example, "STREET CLOSURE NOTICE DESC" for road closures, "WATER OUTAGE NOTICE DESC" for planned water interruptions, or "SNOW EMERGENCY NOTICE DESC" for emergency weather declarations, etc. Each defined object 407 may include, without limitation, identifiers, descriptive labels, timestamps, and explanatory details that conform to a recognized schema, ensuring consistency and clarity across the dataset. The DTS 402 may also receive undefined string objects 406, which may originate from various external or internal data sources. Undefined string objects 406 may include unstructured or semi-structured data entries, such as advisory headlines, public bulletins, maintenance logs, and real-time alerts, each with its own formatting, categorization, and metadata. These undefined string objects 406 may contain variations, abbreviations, or non-standard terminology, such as "CITYREC1.NOTICES.Desc_LINE" for street closure advisories or "MAINT.LOG.Desc_FIELD" for park maintenance alerts.

To match between defined objects 407 and undefined string objects 406, the DTS 402 applies a first model 440, which may implement a similarity estimation algorithm such as minhash or another suitable method. The first model 440 analyzes features of each defined object 407 and undefined string object 406, comparing textual content, structure, and key descriptors to calculate similarity scores 495. For example, the first model 440 may tokenize both "STREET CLOSURE NOTICE DESC" and "CITYREC1.NOTICES.Desc_LINE," evaluate their word overlap and semantic proximity, and assign a similarity score 495 indicating the degree of correspondence (e.g., a score of 0.60 for substantial similarity). Based on the similarity scores 495 produced by the first model 440, the DTS 402 constructs a first ordered array 452. The first ordered array 452 may be a matrix or table that pairs each defined object 407 with the most similar undefined string object 406, alongside the calculated similarity score. This structured array allows for filtering and prioritization, retaining only the most relevant matches for further processing and standardization. The similarity scores 495 in the first ordered array 452 may be used subsequent decision-making, as described in more detail in FIG. 5, such as which undefined string objects 406 should be mapped to standardized defined objects 407, which entries are eligible for manual review, or which should be excluded from further processing.

Based on the similarity scores 495 produced by the first model 440, the DTS 402 may selectively reduce the set of undefined string objects 406 by retaining only those entries that meet or exceed a predetermined similarity threshold (e.g., 50 percent similarity). In some configurations, undefined string objects 406 that demonstrate sufficient correspondence to defined objects 407 may be flagged for further processing, while entries with lower similarity may be excluded or deprioritized or removed entirely from the dataset.

Figure 5:
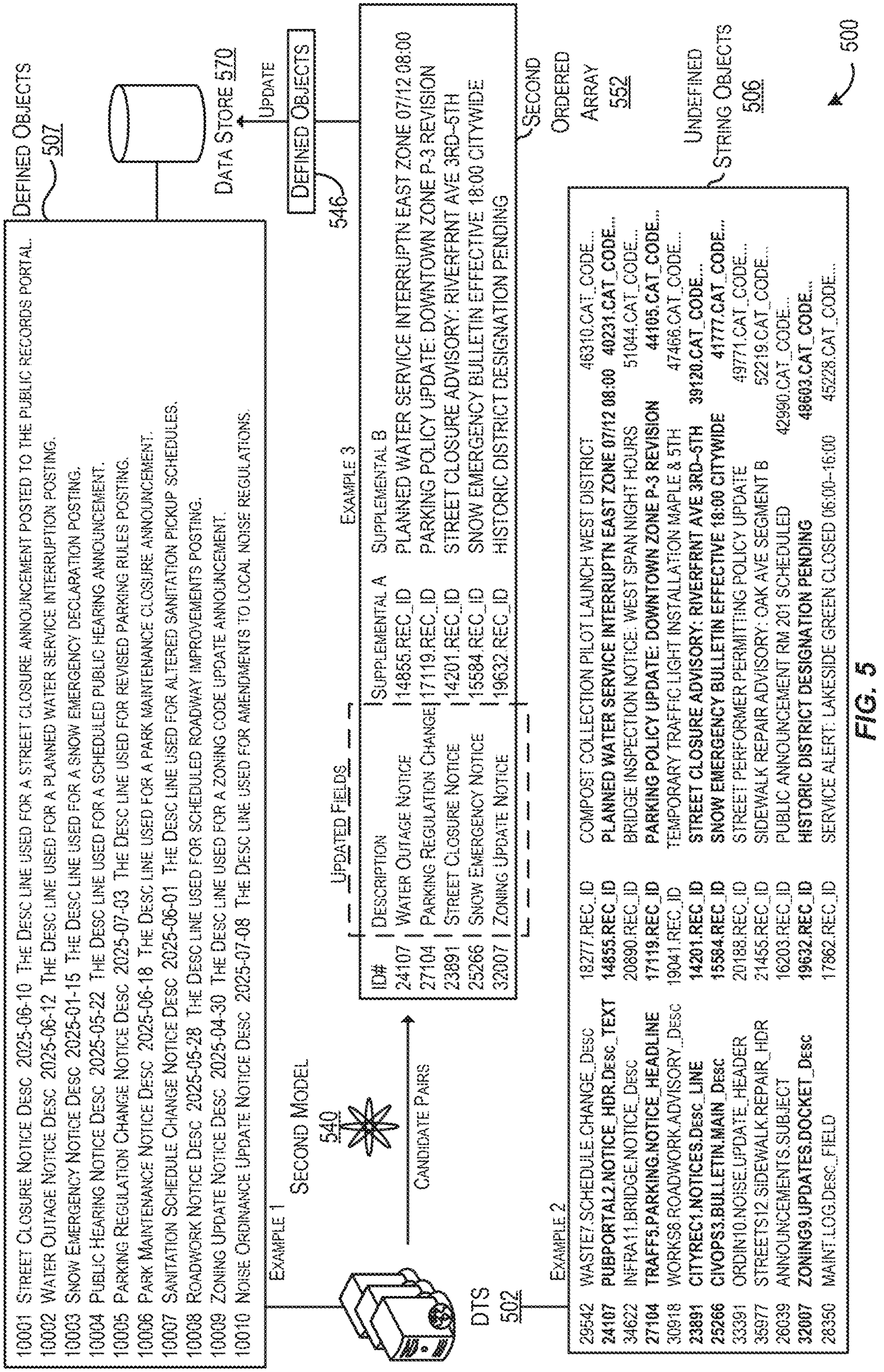
FIG. 5 a simplified block diagram of example process for generating a second ordered array, according to certain embodiments.

FIG. 5 a simplified block diagram of example process 500 for generating a second ordered array, according to certain embodiments. By way of a non-limiting example, as described in FIG. 4, defined objects 507 may be retrieved from data store 570, representing standardized categories and descriptions for various types of public notices. Each defined object 507 may include an identifier, a descriptive label, a date stamp, and an explanatory field that clearly delineates the nature and content of the notice (e.g., "Street Closure Notice Desc" for road closures, "Water Outage Notice Desc" for planned service interruptions, "Snow Emergency Notice Desc" for emergency weather declarations). Further, as described in FIG. 4, undefined string objects 506 may originate from disparate sources and exhibit considerable variability in structure, terminology, and formatting. These entries may include, without limitation, advisory headlines, bulletin descriptions, maintenance logs, real-time alerts, or other records with unique identifiers, supplemental descriptions, and other suitable metadata (e.g., "PUBPORTAL2.NOTICE_HDR.Desc_TEXT" with a supplemental record ID and a descriptive field such as "PLANNED WATER SERVICE INTERRUPTN EAST ZONE 07/12 08:00"). As depicted in the examples, undefined string objects 506 may contain fields such as REC_ID, CAT_CODE, or other domain-specific codes and descriptors.

The similarity scores determined in FIG. 4, which quantify the correspondence between defined objects 507 and undefined string objects 506, are used as input to the second model 540 in FIG. 5. The second model 540 may be implemented as a LSH model or another candidate function that efficiently identifies pairs with high similarity. The second model 540 processes the first ordered array generated previously, selects the best matches, and consolidates the relevant information into a new structured format. The output of the second model 540 may be the second ordered array 552, which presents new standardized entries that synthesize information from both defined objects 507 and undefined string objects 506. Each entry in the second ordered array 552 may include of an updated identifier (ID #), a standardized description, and supplemental fields that retain important context from the original undefined string objects 506. Specifically, the supplemental fields (e.g., Supplemental A and Supplemental B) may capture domain-specific attributes such as REC_ID and detailed advisory text. Within the second ordered array 552, the Description field is updated to reflect the standardized category from the defined objects 507 (e.g., "Water Outage Notice"), while the Supplemental A field retains the relevant record identifier (e.g., "14855.REC_ID") and the Supplemental B field captures the original advisory or descriptive text (e.g., "PLANNED WATER SERVICE INTERRUPTN EAST ZONE 07/12 08:00"). This integration preserves both the standardized structure and the detailed context necessary.

In certain embodiments, the DTS 502 may execute a fuzzy function on the first ordered array to further refine the similarity assessment between undefined string objects and defined string objects. The fuzzy function may include any suitable string similarity or distance metric, such as Levenshtein distance, edit distance, Jaro-Winkler, or cosine similarity, which is applied to the entries in the first ordered array. By executing the fuzzy function, the DTS 502 may evaluate the degree of similarity between string objects beyond token or hash-based comparisons, accommodating for typographical errors, minor spelling variations, or formatting inconsistencies. The output of the fuzzy function may be incorporated into the similarity scores, used to update the ranking or prioritization of candidate pairs, or serve as an additional threshold for filtering entries before subsequent processing steps.

Figure 6:
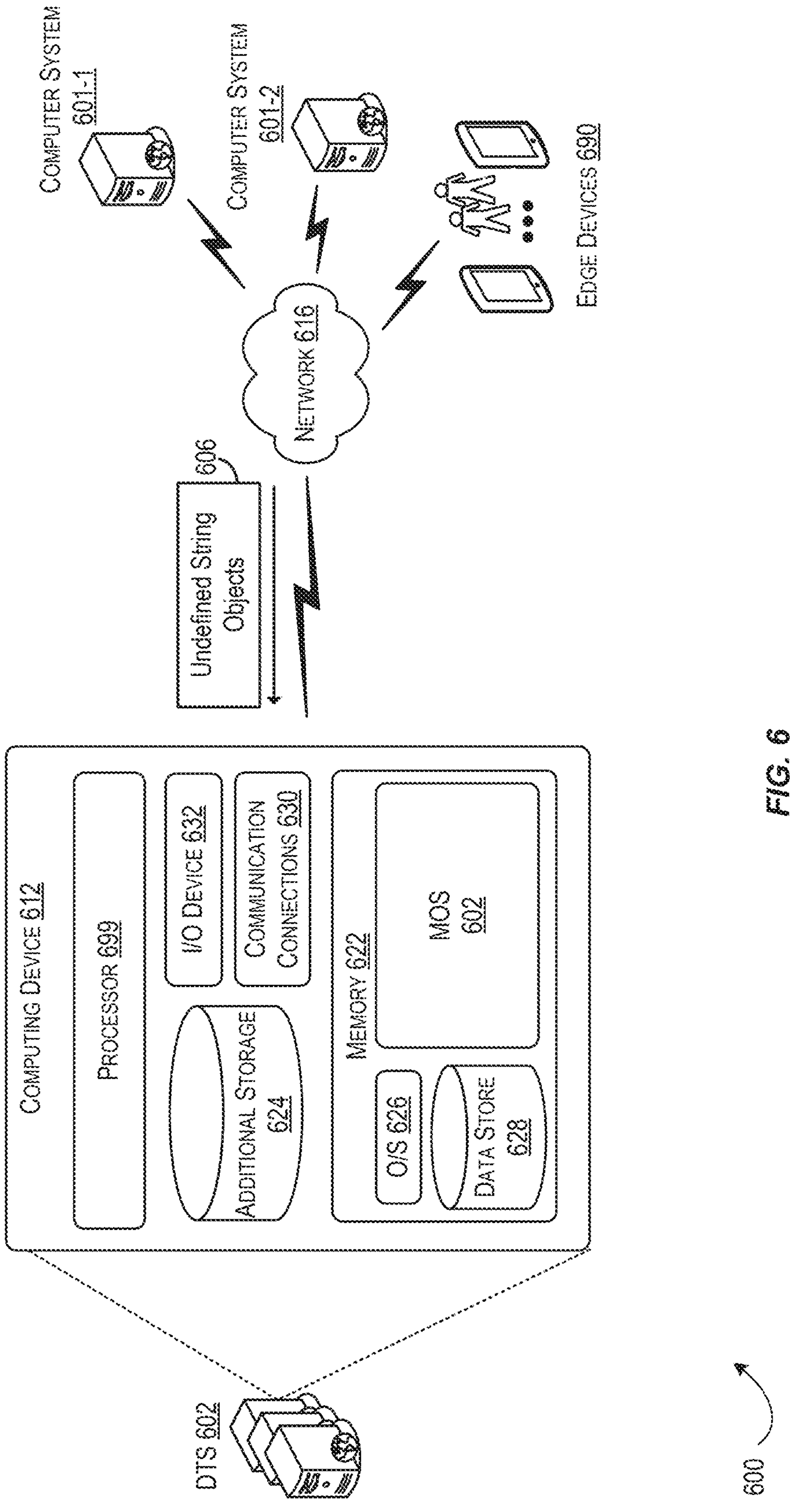
FIG. 6 is a simplified diagram of example cloud network used to implement systems and processes for a memory usage reduction process for aggregating undefined string objects from disparate data stores, according to certain embodiments.

FIG. 6 is a simplified diagram of example cloud network 600 used to implement systems and processes for a memory usage reduction process for aggregating undefined string objects from disparate data stores, according to certain embodiments. By way of a non-limiting example, an DTS 602 (which is an example of DTS 502 with respect to FIG. 5) may be hosted on a computing device 612, which may include one or more processors 699. The processors 699 may be realized through hardware, computer-executable instructions, firmware, or any combination thereof. Computer-executable and firmware implementations of processors 699 may include instructions written in any suitable programming language for executing tasks associated with the DTS 602.

The computing device 612 may include memory 622, which may store computer-executable instructions loadable and executable by the processors 699, as well as data generated or received during execution of the DTS 602. Memory 622 may be volatile (e.g., RAM) and/or non-volatile (e.g., ROM, flash memory). Computing device 612 may further include additional storage 624, which may be removable or non-removable and may consist of magnetic storage, optical disks, tape storage, or other suitable media for persistent data retention. The combination of memory 622 and additional storage 624 may provide non-transitory computer-readable storage media for storing instructions, data structures, program components, and other information necessary for operation of the DTS 602.

The memory 622 may store an operating system (O/S) 626, instructions for executing functionalities of the DTS 602, one or more data stores 628, and application programs, components, or services relevant to the disclosed processes. The computing device 612 may include communication connections 630, which may allow the device to interface with databases, other computing devices, servers, user terminals, and/or additional systems over one or more networks 616. Networks 616 may include any suitable combination of wired or wireless networks, such as the Internet, cellular networks, private enterprise networks, and other public or private communication infrastructures.

Input and output devices (I/O devices) 632 may be provided as part of computing device 612, including but not limited to keyboards, mice, touchscreens, displays, speakers, printers, and other user or system interfaces. Computer systems 601 and/or one or more edge devices 690 may communicate with the DTS 602 over network 616, transmitting undefined string objects 606 for processing, analysis, and memory reduction as described in prior figures. The DTS 602 may aggregate, store, and process these undefined string objects 606, performing normalization, similarity analysis, and transformation into standardized representations for further technical operations and downstream applications.

The various embodiments can be further implemented in a variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a -area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile storage, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

Figure 7:
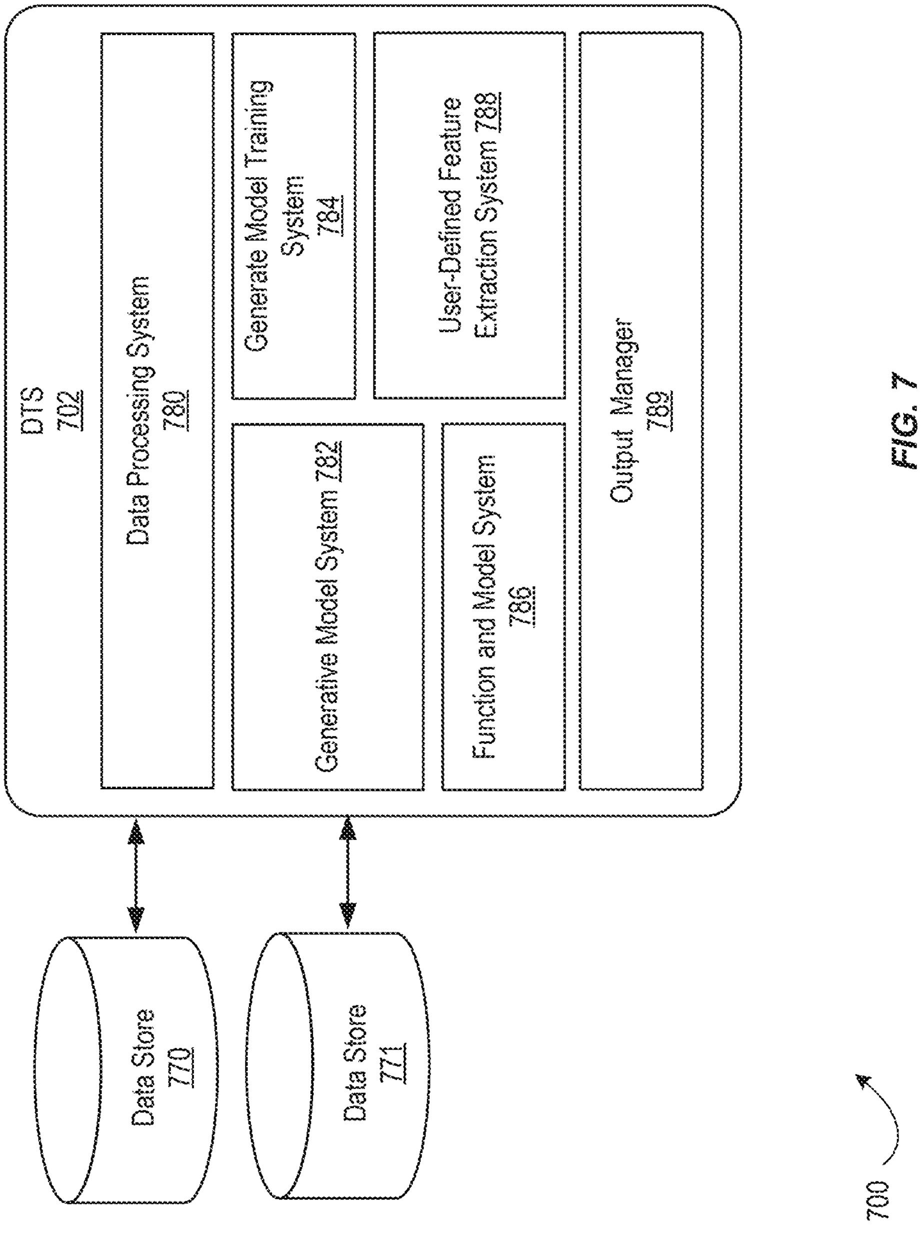
FIG. 7 is a simplified diagram of example computer architecture, according to certain embodiments.

FIG. 7 is a simplified diagram of example computer architecture 700, according to certain embodiments. By way of a non-limiting example, an DTS 702 (which is an example of DTS 602 with respect to FIG. 6) may be a hub for aggregating, standardizing, analyzing, and/or deploying data and generative models across various technical environments. The DTS 702 interfaces with two principal data stores: data store 770, which contains defined data objects, and data store 771, which provides undefined data objects. Data store 770 may hold entries that have been validated, standardized, and/or modified to conform to a recognized schema, such as reference descriptors, standard identifiers, or domain-specific terminology. Data store 771 may supply raw, unstructured, or semi-structured data objects, including entries originating from disparate sources, devices, and formats. The DTS 702 may include a data processing system 780, which acts as an input interface for receiving, normalizing, and preparing data for subsequent operations. The data processing system 780 may ingest data streams from external repositories, edge devices, sensors, or other computer systems. The data processing system 780 may perform initial compatibility checks, data cleaning routines, and format conversions to ensure consistent integration of incoming data objects.

A generative model system 782 may be responsible for storing generative models that are associated with data store 770 and data store 771. The generative model system 782 may maintain a repository of trained generative models, each unique to a specific technical domains, data categories, or operational standards. These generative models may be used for tasks such as classification, anomaly detection, prediction, clustering, or automated content generation. The generative model system 782 may also manage versioning, metadata, and model performance metrics, supporting efficient retrieval and deployment. In addition, or alternatively, a generative model training system 784, which generates and trains generative models using curated datasets drawn from data store 770 and data store 771 may be included. The generative model training system 784 may implement supervised, unsupervised, or semi-supervised learning techniques, leveraging both labeled and unlabeled data to refine model accuracy and generalizability. During the training process, the generative model training system 784 may perform data preprocessing, feature extraction, parameter optimization, and validation.

A function and model system 786 may be incorporated within DTS 702 to implement the first and second models described FIG. 2. The function and model system 786 may execute similarity estimation algorithms, such as minhash functions, to generate compact representations of string objects for efficient comparison. The function and model system 786 may also apply candidate selection algorithms, such as LSH, to identify probable matches and consolidate data entries. The user-defined feature extract system 788 may provide capabilities for converting images, video frames, or other suitable equivalents into embeddings and/or undefined string objects. The user-defined feature extract system 788 may utilize techniques such as optical character recognition, image-to-text translation, feature encoding, or deep learning-based embedding generation. For example, scanned documents may be translated into string objects, photographs of technical labels may be converted into feature vectors, and environmental scene images may be processed to produce descriptive embeddings. The user-defined feature extract system 788 ensures that non-textual data can be seamlessly integrated with textual datasets for downstream analysis.

An output manager 789 is included within DTS 702 to coordinate and facilitate some or all outputs generated by the DTS 702. The output manager 789 may be responsible for deploying trained generative models to external systems, edge devices, and/or cloud platforms. The output manager 789 may also generate new defined string objects for updating data stores 770 and 771, ensuring that standardized entries are consistently propagated throughout the cloud environment. Additional functions of the output manager may include controlling operational aspects of edge devices, synchronizing data stores, managing user notifications, and supporting automated decision workflows. The output manager 789 may provide APIs, data export utilities, and integration points for other systems. Some or all components of DTS 702 may communicate via internal data buses, network interfaces, or inter-process communication mechanisms.

Figure 8:
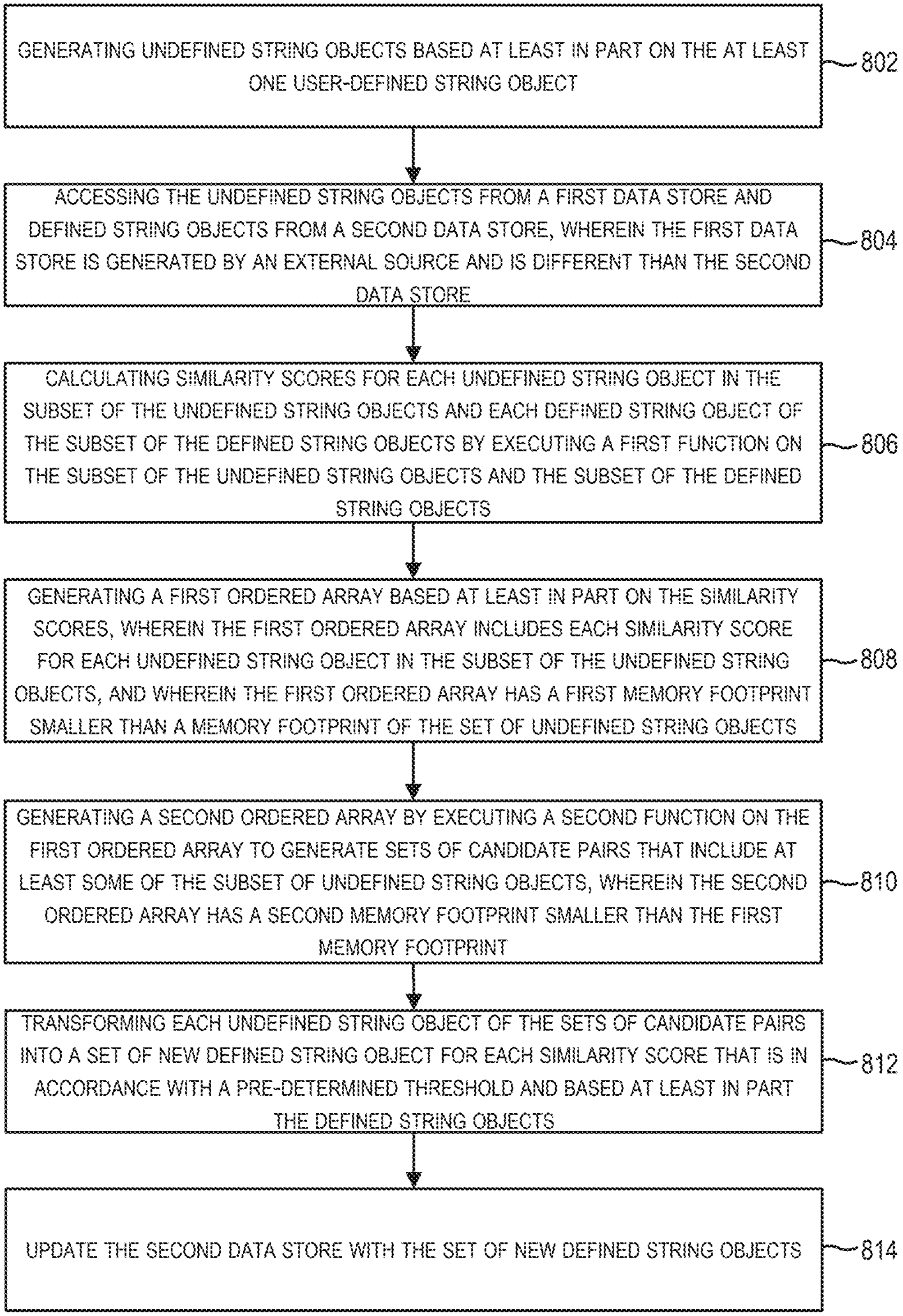
FIG. 8 is a simplified diagram of an example method for a memory usage reduction process for aggregating undefined string objects from disparate data stores, according to certain embodiments.

FIG. 8 is a simplified diagram of an example method 800 for a memory usage reduction process for aggregating undefined string objects from disparate data stores, according to certain embodiments. A non-transitory computer-readable storage medium may store computer-executable instructions that, when executed by at least one processor, cause at least one computer to perform instructions comprising the operations of the method 800. It should be appreciated that the operations of the method 800 may be performed in any suitable order, not necessarily the order depicted in FIG. 8. Further, the method 800 may include additional, or fewer operations than those depicted in FIG. 8. The operations of method 800 may be performed by any suitable portion of the DTS 702 of FIG. 7 (an example of the DTS 102 with respect to FIG. 1) which may include one or more computing devices such as computing device 612 with respect to FIG. 6.

At block 802, the method 800 includes generating undefined string objects based at least in part on the at least one user-defined string object. By way of a non-limiting example, the system may receive images of objects associated with transferrable resources, where each image contains at least one user-defined string object; and may generate the undefined string objects based at least in part on the at least one user-defined string object. For example, a user may capture a photograph of a paper check using a mobile device (e.g., edge device 390 with respect to FIG. 3, as depicted in the flow diagram in FIG. 1). The camera (e.g., camera 392 with respect to FIG. 3) may acquire an image that includes handwritten or printed information, such as the check amount, payee, and signature. The user-defined feature extract system (e.g., user-defined feature extract system 788 with respect to FIG. 7) may perform optical character recognition and feature extraction, converting the visual elements into undefined string objects (e.g., undefined string objects 306 with respect to FIG. 3). These undefined string objects may include fields such as "amount: 2540.37, payee: Sam Taylor, signature: [vector embedding]". In another example, a research institution may use an edge device to capture images of environmental sensors (see the sensor deployment example with respect to FIG. 2). The system may extract serial numbers, location labels, and measurement units from the photographs, generating undefined string objects that describe each sensor and its readings. The images may contain barcodes, QR codes, or alphanumeric identifiers, which are parsed and transformed into structured string objects.

At block 804, the method 800 includes accessing the undefined string objects from a first data store and defined string objects from a second data store. By way of a non-limiting example, the first data store may be generated by an external source and may be different than the second data store. For example, undefined string objects may be accessed from an external repository, such as a remote cloud server or distributed file system (e.g., data store 271 with respect to FIG. 2, as referenced in the system diagram with respect to FIG. 6). These undefined string objects might include raw sensor readings, device logs, or transaction records sourced from third-party vendors or field devices. Defined string objects, meanwhile, may be retrieved from an internal, curated repository (e.g., data store 270 with respect to FIG. 2 or data store 770 with respect to FIG. 7), containing validated descriptors such as standardized transaction categories, approved taxonomic labels, or canonical location identifiers. The data processing system (e.g., data processing system 780 with respect to FIG. 7) may coordinate the integration and normalization of these disparate data sources, ensuring compatibility and data integrity. In FIG. 1, the process is shown as the transition from accessing undefined string objects from disparate computer systems 172 to integrating them with defined string objects. For instance, in a banking scenario, undefined string objects may represent transaction records from external payment networks, while defined string objects are the institution's standardized transaction categories. In environmental monitoring, undefined string objects may be raw field sensor logs, and defined string objects are validated measurement types.

At block 806, the method 800 includes calculating similarity scores for each undefined string object in the subset of the undefined string objects and each defined string object of the subset of the defined string objects by executing a first function on the subset of the undefined string objects and the subset of the defined string objects. By way of a non-limiting example, the system may apply a similarity estimation algorithm, such as a minhash function, to both subsets and generate compact signatures or scores that quantify their correspondence. For example, a function and model system (e.g., function and model system 786 with respect to FIG. 7) may tokenize each string object into components, such as words or character shingles, and apply randomized permutations to generate minhash signatures. In practice, this may involve comparing entries like "MTG_PMT" and "Mortgage Payment" from undefined string objects against standardized categories in defined string objects, as depicted with respect to the similarity calculation step of FIG. 1 and further detailed in the process block diagram of FIG. 4 (first model 440). In a scientific data context, the system may compare sensor readings such as "temp: 21.5 C, loc: Amazon_River" from an undefined string object to defined object strings like "Amazon River Basin" and "Celsius". The minhash-based similarity scores quantify how closely the entries align, enabling efficient filtering of relevant matches.

At block 808, the method 800 includes generating a first ordered array based at least in part on the similarity scores. By way of a non-limiting example, the first ordered array may include each similarity score for each undefined string object in the subset of the undefined string objects, and the first ordered array may have a first memory footprint smaller than a memory footprint of the set of undefined string objects. The system may determine an amount of the undefined string objects and may apply at least one random permutation to the undefined string objects and the defined string objects in accordance with the amount. Generating the first ordered array may be based at least in part on extracting at least one identifier associated with at least one value for each random permutation and populating the first ordered array with the at least one identifier and the at least one value. For example, in the context of a public notice system (see FIG. 4), the first ordered array (e.g., first ordered array 452 with respect to FIG. 4) may be constructed as a matrix, where each row represents an undefined string object (such as advisory headlines or maintenance logs) and each column encodes the similarity score to a defined object (such as "STREET CLOSURE NOTICE DESC"). Identifiers such as record IDs, timestamps, or category codes may be included, derived from random permutations of the string objects. In an environmental monitoring example (as described with respect to FIG. 2), the first ordered array may list similarity scores between raw sensor readings and standardized environmental descriptors. The system may filter out entries with low similarity, retaining only those relevant for further analysis which may reduce the size of the working dataset.

At block 810, the method 800 includes generating a second ordered array by executing a second function on the first ordered array to generate sets of candidate pairs that include at least some of the subset of undefined string objects. By way of a non-limiting example, the second ordered array may have a second memory footprint smaller than the first memory footprint. For example, the second function may be implemented as a locality sensitive hashing (LSH) algorithm, which divides minhash signatures into bands and hashes each band into buckets. Candidate pairs whose signatures match within a band may be grouped and included in the second ordered array (e.g., second ordered array 552 with respect to FIG. 5). In an example, this process may group variations of "Mortgage Payment" transactions, regardless of format, into standardized candidate pairs. In another example, the LSH-based reduction may group sensor readings from similar locations or devices, even if the original string objects are formatted differently or contain minor spelling variations. The generation and grouping of candidate pairs described with respect to FIG. 5, where undefined string objects 506 and defined objects 507 are paired and consolidated into the second ordered array 552.

At block 812, the method 800 includes transforming each undefined string object of the sets of candidate pairs into a set of new defined string object for each similarity score that is in accordance with a pre-determined threshold and based at least in part the defined string objects. By way of a non-limiting example, executing the second function may further comprise executing a fuzzy function on the first ordered array. The first function may be a minhash function and the second function may be a locality sensitive hashing function. For example, the system may refine candidate pairs using a fuzzy similarity metric, such as Levenshtein distance, edit distance, Jaro-Winkler, or cosine similarity, which accommodates for typos, abbreviations, or domain-specific variations. Only those pairs meeting a pre-determined similarity threshold may be transformed into new defined string objects (e.g., new defined string objects 246 with respect to FIG. 2). In a check processing system, this may result in a new defined string object that combines the validated payee name, standardized check format, and an encoded representation of the signature. In targeted marketing with customer consent (as described with respect to FIG. 6), new defined string objects may aggregate transaction details, customer profiles, and campaign eligibility data, synthesized from raw transaction logs and standardized descriptors. The transformation process may include merging additional metadata, annotating records with validation status, and associating context-specific attributes such as sensor location, device ID, or transaction time.

At block 814, the method 800 includes update the second data store with the set of new defined string objects. By way of a non-limiting example, the system may generate a trained generative model by training a generative model (e.g., generative model training system 784 with respect to FIG. 7) using the set of new defined string objects curated and stored within a data store (e.g., data store 770 with respect to FIG. 7). Once training is complete, the output manager (e.g., output manager 789 with respect to FIG. 7) may provide new undefined string objects as input to the trained generative model (e.g., generative model system 782 with respect to FIG. 7), which then analyzes these inputs and produces an output that includes an anomaly classification for each entry. In an example, the system may process a newly captured check image (e.g., edge device 390 and camera 392 with respect to FIG. 3), extract relevant features as undefined string objects, and use the trained model to classify the transaction as either normal or anomalous. Based on the anomaly classification, the system may control the allocation of at least one transferrable resource from a first entity to a second entity, such as approving or rejecting a transaction, granting or denying access privileges, or triggering an operational alert, coordinated through the output manager and reflected in updates to the data store (e.g., data store 770 with respect to FIG. 7) and synchronization with edge devices or cloud systems (see network 616 with respect to FIG. 6).

Additionally, the system may receive further undefined string objects, such as new transaction records or sensor readings from external data sources (e.g., data store 271 with respect to FIG. 2), and may generate a comparison metric by analyzing and comparing these new undefined string objects to the set of new defined string objects, with the function and model system (e.g., function and model system 786 with respect to FIG. 7) quantifying the degree of similarity or alignment. The system may then use the results of this comparison metric, in conjunction with the generative model's evaluation, to decide whether to allocate a transferrable resource from one entity to another, such as granting access, transferring ownership, or authorizing a transaction, while updating relevant data stores, issuing automated notifications via the output manager, and taking real-time actions through edge devices or cloud services with respect to FIGS. 1-7.

Example 3: Transferrable Resource Acceptance/Rejection

By way of a non-limiting example, a user, such as a bank customer, wishes to deposit a paper check by capturing its details with a mobile device. The user opens a banking application on a smart phone (e.g., an edge device with respect to FIG. 3) and uses the phone's camera (e.g., camera 392 with respect to FIG. 3) to take a photograph of the front of the check. The application prompts the user to manually enter or confirm additional details such as the check amount and the payee name. The captured image, along with the user-entered values, constitutes user-defined features (e.g., user-defined features 394 with respect to FIG. 3). The banking application processes the captured image using on-device or cloud-side algorithms to extract relevant information such as the numerical amount, payee name, and signature. For example, optical character recognition is applied to the image to convert the handwritten or printed amount ("$2,540.37"), the payee ("Sam Taylor"), and the signature into a text-based embedding or string. These extracted values are combined into an undefined string object (e.g., undefined string object 306 with respect to FIG. 3) that includes fields such as "amount: 2540.37, payee: Sam Taylor, signature:." The edge device 390 transmits the undefined string object 306 to a bank computer system (e.g., computer system 372-1 with respect to FIG. 3), which may further normalize, format, or enrich the data as desired.

The undefined string object 306 may be delivered to the DTS (e.g., DTS 302 with respect to FIG. 3, or DTS 202 with respect to FIG. 2). At this stage, the DTS aggregates incoming undefined string objects from multiple devices and sources, as described in the general memory usage reduction process. The DTS may access a set of defined string objects (e.g., defined string objects 107 with respect to FIG. 1 or defined object strings 207 with respect to FIG. 2) stored in a secure data store (e.g., data store 270 with respect to FIG. 2), which represent validated records for recognized payees, standard check formats, and known signature templates. To compare the undefined string object with the defined string objects, the DTS may apply a first model (e.g., first model 240 with respect to FIG. 2), which may implement a minhash function. The minhash function tokenizes and hashes the fields of the undefined string object 306 and each defined string object 207, creating similarity scores that quantify how closely the new check matches the bank's standardized representations (e.g., calculating similarity scores and organizing them into a first ordered array, such as first ordered array 242 with respect to FIG. 2). The DTS may filter the results to retain only those undefined string objects with sufficient similarity to a defined string object described in the construction of a first ordered array. For example, a similarity score above a preset threshold (e.g., 80% match for the payee name, 95% match for the signature embedding) results in the check entry being flagged as eligible for further processing.

To further reduce the candidate pool and increase confidence, the DTS 502 may apply a second model (e.g., second model 244 with respect to FIG. 2 or second model 540 with respect to FIG. 5), which may use LSH to group the minhash signatures into candidate pairs. This may produce a second ordered array (e.g., second ordered array 244 with respect to FIG. 2, or second ordered array 552 with respect to FIG. 5), which may refine the pool to most probable matches and synthesizes new defined string objects. In this financial context, the new defined string object may combine a validated payee name from the bank's master list, the extracted (and standardized) check amount, and a representation of the captured signature. The DTS 502 may then evaluate whether to authorize the transfer of funds from the check writer's account to the payee's account (e.g., controlling allocation of a transferrable resource). In a successful scenario, the new defined string object 246 aligns with the bank's records: the payee is recognized, the check format is standard, and the signature sufficiently matches a known template. The DTS initiates the cash transfer, updating relevant account databases (e.g., data store 270 with respect to FIG. 2 or data store 770 with respect to FIG. 7), and notifies both parties of the successful transaction. The output manager (e.g., output manager 789 with respect to FIG. 7) may also trigger a generative model (e.g., generative model 299 with respect to FIG. 2 or generative model system 782 with respect to FIG. 7) to log the transaction for future anomaly detection or pattern analysis.

In a difference scenarios where the extracted signature does not match a template in the bank's records, or the payee's name is formatted in an unexpected way, leading to a low similarity score in the first ordered array or the second ordered array. The DTS may classify the transaction as anomalous using a comparison metric, and the transfer of funds is automatically declined. The user is notified of the anomaly, and the transaction is flagged for manual review by a bank employee. In this case, the transferrable asset (the check amount) is not released to the payee, and no update to the account databases occurs.

Example 4: Targeted Campaigns

By way of a non-limiting example, a bank undertakes an initiative to identify customers who are most likely to benefit from targeted financial campaigns, such as offers for mortgage rate reductions or lower interest credit products. The bank collects an extensive dataset of transaction records from an enterprise data warehouse and from various external sources, such as card processors, payment networks, and/or third-party aggregators. Each data source may provide transaction records in its own proprietary format, based on customer consent, with inconsistent field names, abbreviations, and categorization methods (e.g., "MTG_PMT" for mortgage payment, "INT_ADJ" for interest adjustment, "PMT" for generic payments). These raw transaction records are received by the bank's computer systems and edge devices (e.g., computer systems 601 and edge devices 690 with respect to FIG. 6), then transmitted over the bank's secure network (e.g., network 616 with respect to FIG. 6) to the data targeting system (DTS) (e.g., DTS 602 with respect to FIG. 6, or DTS 702 with respect to FIG. 7).

Each transaction record may be converted into an undefined string object (e.g., undefined string objects 606 with respect to FIG. 6, or undefined data objects with respect to FIG. 7). These undefined string objects may include transaction descriptions, merchant names, payment types, amounts, dates, and customer identifiers, but each string object may use different terminology and formatting based on its source (e.g., "MTG_PMT," "Mortgage Payment," "Loan Paymt," or even OCR-derived fields from scanned statements). As the DTS receives this influx of undefined string objects, it aggregates and normalizes the data using its data processing system (e.g., data processing system 780 with respect to FIG. 7). The DTS accesses a set of defined data objects representing standardized transaction categories, canonical merchant names, and validated customer identifiers (e.g., defined data objects stored in data store 770 with respect to FIG. 7). These defined data objects may have been previously curated, validated, and periodically updated using generative models (e.g., generative model system 782 with respect to FIG. 7).

To reconcile the undefined string objects with the standardized transaction categories, the DTS applies a first model (e.g., first model within function and model system 786 with respect to FIG. 7), which may use a minhash function to tokenize and hash the transaction strings, producing similarity scores (e.g., similarity scores calculated as in FIG. 4). These similarity scores are organized into a first ordered array (e.g., first ordered array 452 with respect to FIG. 4), which pairs each undefined string object with its closest standardized match. For instance, the DTS may determine that "Loan Paymt" and "MTG_PMT" both most closely correspond to the defined category "Mortgage Payment." Based on a predetermined similarity threshold (e.g., 70% or higher), the DTS filters and retains only those transaction records with high-confidence matches to standardized categories, as described in the reduction process in FIG. 4. The DTS then applies a second model, such as LSH (e.g., second model within function and model system 786 with respect to FIG. 7), to group minhash signatures into candidate pairs and refine the results. This generates a second ordered array (e.g., second ordered array 552 with respect to FIG. 5), consolidating all relevant transaction records for each customer under standardized categories.

The DTS uses the output of the second ordered array to synthesize new defined string objects (e.g., new defined objects 546 with respect to FIG. 5) that represent each customer's normalized transaction history. Each new defined string object may aggregate details such as total monthly mortgage payments, frequency of extra principal payments, and history of interest rate adjustments. These new defined string objects are stored in the bank's secure data store (e.g., data store 770 with respect to FIG. 7). The DTS then leverages its generative model system (e.g., generative model system 782 with respect to FIG. 7) and generative model training system 784 to analyze the standardized customer records. The generative model (e.g., generative model 299 with respect to FIG. 2 or generative model 782 with respect to FIG. 7) is trained using both labeled and unlabeled customer data, learning patterns that are indicative of customers who are likely to benefit from a mortgage reduction or lower interest rate offer. Labeled data may include historical outcomes, such as customers who previously accepted or declined similar offers, while unlabeled data allows the generative model to identify emerging trends or new customer segments.

For instance, the generative model may identify that customers who have made several additional principal payments in the past year, or who have a history of on-time mortgage payments but a high debt-to-income ratio, are especially responsive to targeted offers. The generative model may also flag customers whose transaction histories indicate financial stress (e.g., frequent late fees, overdraft charges, or declining balances) as priority candidates for personalized outreach to provide aide and support to those customers. The DTS's output manager (e.g., output manager 789 with respect to FIG. 7) may compile a ranked list of customers, each with a profile summarizing why they are a strong candidate for the campaign. This list is transmitted to the bank's marketing systems, which initiate personalized communications (e.g., emails, app notifications, or direct mail) where consent is given by the customer by offering qualified customers lower mortgage rates or refinancing options to help the customers a better financial situation.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed. On the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about," "substantially", "similar to", "similar", or "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:

receiving, from a group of cameras of a group of edge devices, images of visual elements, wherein the visual elements represent handwritten information or printed information;

generating undefined string objects based at least in part on converting the images of the visual elements by performing optical character recognition and feature extraction;

accessing the undefined string objects from a first data store and defined string objects from a second data store, wherein the undefined string objects have a first memory footprint in the first data store;

generating similarity scores based at least in part on calculating a similarity score for each undefined string object in the undefined string objects and for each defined string object of the defined string objects by executing a minhash function on the undefined string objects and the defined string objects;

generating a first ordered array based at least in part on the similarity scores, wherein the first ordered array comprises each similarity score of the similarity scores for each undefined string object in the undefined string objects and each similarity score of the similarity scores for the defined string object of the defined string objects;

storing the first ordered array in a memory based at least in part on generating the first ordered array, wherein the first ordered array has a second memory footprint in the memory that is smaller than the first memory footprint in the first data store;

generating a second ordered array by executing a locality sensitive hashing function on the first ordered array to generate sets of candidate pairs that include at least some of the undefined string objects;

storing the second ordered array in the memory based at least in part on generating the second ordered array, wherein the second ordered array has a third memory footprint in the memory that is smaller relative to the second memory footprint in the memory;

transforming each undefined string object of the sets of candidate pairs into a set of new defined string objects for each similarity score of the similarity scores that is in accordance with a pre-determined threshold and based at least in part the defined string objects; and updating the second data store with the set of new defined string objects.

2. The computer-implemented method of claim 1, wherein generating the first ordered array further comprises:

determining an amount of the undefined string objects; and applying at least one random permutation to the undefined string objects and the defined string objects in accordance with the amount, wherein generating the first ordered array is based at least in part on extracting at least one identifier associated with at least one value for each random permutation of the at least one random permutation and populating the first ordered array with the at least one identifier and the at least one value.

3. The computer-implemented method of claim 1, wherein each image of the images has at least one user-defined string object and wherein generating the undefined string objects is further based at least in part on the at least one user-defined string object.

4. The computer-implemented method of claim 1, further comprising:

generating a trained generative model by training a generative model based at least in part on the set of new defined string objects;

providing, as input, new undefined string objects to the trained generative model;

receiving, as output from the trained generative model, an anomaly classification of the new undefined string objects; and controlling allocation of at least one transferrable resource from a first entity to a second entity based at least in part on the anomaly classification.

5. The computer-implemented method of claim 1, further comprising:

receiving new undefined string objects;

generating a comparison metric based at least in part on comparing the new undefined string objects to the set of new defined string objects; and controlling allocation of at least one transferrable resource from a first entity to a second entity based at least in part on the comparison metric.

6. The computer-implemented method of claim 1, wherein generating the second ordered array further comprises execute executing a fuzzy function on the first ordered array.

7. The computer-implemented method of claim 1, wherein the handwritten information is first handwritten information, and the printed information is first printed information, and wherein the computer-implemented method further comprises:

generating a trained generative model by training a generative model based at least in part on the set of new defined string objects;

receiving, from a first camera of the group of cameras of a first edge device of the group of edge devices, an image of a visual element, wherein the visual element represents second handwritten information or second printed information;

generating an undefined string object based at least in part on the image of the visual element; and determining the undefined string object is associated with an anomaly based at least in part on providing the undefined string object to the trained generative model;

performing, based at least in part on the anomaly, at least one of:

causing transfer of a transferrable asset based at least in part on approving a transaction associated with the visual element, blocking transfer of the transferrable asset based at least in part on rejecting the transaction associated with the visual element, or triggering an operational alert associated with an account of the first edge device.

8. A computing device, comprising:

one or more processors; and one or more memories storing computer-executable instructions that, when executed by the one or more processors, causes the one or more processors to:

receive, from a group of cameras of a group of edge devices, images of visual elements, wherein the visual elements represent handwritten information or printed information;

generate undefined string objects based at least in part on converting the images of the visual elements by performing optical character recognition and feature extraction;

access the undefined string objects from a first data store and defined string objects from a second data store, wherein the undefined string objects have a first memory footprint in the first data store;

generate similarity scores based at least in part on calculating a similarity score for each undefined string object in the undefined string objects and for each defined string object of the defined string objects by executing a minhash function on the undefined string objects and the defined string objects;

generate a first ordered array based at least in part on the similarity scores, wherein the first ordered array comprises each similarity score of the similarity scores for each undefined string object in the undefined string objects and each similarity score of the similarity scores for the defined string object of the defined string objects;

store the first ordered array in a memory based at least in part on generating the first ordered array, wherein the first ordered array has a second memory footprint in the memory that is smaller than the first memory footprint in the first data store;

generate a second ordered array by executing a locality sensitive hashing function on the first ordered array to generate sets of candidate pairs that include at least some of the undefined string objects;

store the second ordered array in the memory based at least in part on generating the second ordered array, wherein the second ordered array has a third memory footprint in the memory that is smaller relative to the second memory footprint in the memory;

transform each undefined string object of the sets of candidate pairs into a set of new defined string objects for each similarity score of the similarity scores that is in accordance with a pre-determined threshold and based at least in part the defined string objects; and update the second data store with the set of new defined string objects.

9. The computing device of claim 8, wherein generating the first ordered array further comprises:

determining an amount of the undefined string objects; and applying at least one random permutation to the undefined string objects and the defined string objects in accordance with the amount, wherein generating the first ordered array is based at least in part on extracting at least one identifier associated with at least one value for each random permutation of the at least one random permutation and populating the first ordered array with the at least one identifier and the at least one value.

10. The computing device of claim 8, wherein each image of the images has at least one user-defined string object and wherein generating the undefined string objects is further based at least in part on the at least one user-defined string object.

11. The computing device of claim 8, wherein executing the instructions further causes the one or more processors to:

generate a trained generative model by training a generative model based at least in part on the set of new defined string objects;

provide, as input, new undefined string objects to the trained generative model;

receive, as output from the trained generative model, an anomaly classification of the new undefined string objects; and control allocation of at least one transferrable resource from a first entity to a second entity based at least in part on the anomaly classification.

12. The computing device of claim 8, wherein executing the instructions further causes the one or more processors to:

receive new undefined string objects;

generate a comparison metric based at least in part on comparing the new undefined string objects to the set of new defined string objects; and control allocation of at least one transferrable resource from a first entity to a second entity based at least in part on the comparison metric.

13. The computing device of claim 8, wherein generating the second ordered array further comprises executing a fuzzy function on the first ordered array.

14. The computing device of claim 8, wherein executing the instructions further causes the one or more processors to:

generate a trained generative model by training a generative model based at least in part on the set of new defined string objects;

receive, from a first camera of the group of cameras of a first edge device of the group of edge devices, an image of a visual element, wherein the visual element represents second handwritten information or second printed information;

generate an undefined string object based at least in part on the image of the visual element; and determine the undefined string object is associated with an anomaly based at least in part on providing the undefined string object to the trained generative model;

perform, based at least in part on the anomaly, at least one of:

cause transfer of a transferrable asset based at least in part on approving a transaction associated with the visual element, block transfer of the transferrable asset based at least in part on rejecting the transaction associated with the visual element, or trigger an operational alert associated with an account of the edge device.

15. A non-transitory computer-readable storage medium storing computer-executable instructions that, when executed with one or more processors of a computing device, causes the one or more processors to:

receive, from a group of cameras of a group of edge devices, images of visual elements, wherein the visual elements represent handwritten information or printed information;

generate undefined string objects based at least in part on converting the images of the visual elements by performing optical character recognition and feature extraction;

access the undefined string objects from a first data store and defined string objects from a second data store, wherein the undefined string objects have a first memory footprint in the first data store;

generate similarity scores based at least in part on calculating a similarity score for each undefined string object in the undefined string objects and for each defined string object of the defined string objects by executing a minhash function on the undefined string objects and the defined string objects;

generate a first ordered array based at least in part on the similarity scores, wherein the first ordered array comprises each similarity score of the similarity scores for each undefined string object in the undefined string objects and each similarity score of the similarity scores for the defined string object of the defined string objects;

store the first ordered array in a memory based at least in part on generating the first ordered array, wherein the first ordered array has a second memory footprint in the memory that is smaller than the first memory footprint in the first data store;

generate a second ordered array by executing a locality sensitive hashing function on the first ordered array to generate sets of candidate pairs that include at least some of the undefined string objects;

store the second ordered array in the memory based at least in part on generating the second ordered array, wherein the second ordered array has a third memory footprint in the memory that is smaller relative to the second memory footprint in the memory;

transform each undefined string object of the sets of candidate pairs into a set of new defined string objects for each similarity score of the similarity scores that is in accordance with a pre-determined threshold and based at least in part the defined string objects; and update the second data store with the set of new defined string objects.

16. The non-transitory computer-readable storage medium of claim 15, wherein generating the first ordered array further comprises:

determining an amount of the undefined string objects; and applying at least one random permutation to the undefined string objects and the defined string objects in accordance with the amount, wherein generating the first ordered array is based at least in part on extracting at least one identifier associated with at least one value for each random permutation of the at least one random permutation and populating the first ordered array with the at least one identifier and the at least one value.

17. The non-transitory computer-readable storage medium of claim 15, wherein the instructions further cause the processor to:

wherein each image of the images has at least one user-defined string object and wherein generating the undefined string objects is further based at least in part on the at least one user-defined string object.

18. The non-transitory computer-readable storage medium of claim 15, wherein the instructions further cause the processor to:

generate a trained generative model by training a generative model based at least in part on the set of new defined string objects;

provide, as input, new undefined string objects to the trained generative model;

receive, as output from the trained generative model, an anomaly classification of the new undefined string objects; and control allocation of at least one transferrable resource from a first entity to a second entity based at least in part on the anomaly classification.

19. The non-transitory computer-readable storage medium of claim 15, wherein the instructions further cause the processor to:

receive new undefined string objects;

generate a comparison metric based at least in part on comparing the new undefined string objects to the set of new defined string objects; and control allocation of at least one transferrable resource from a first entity to a second entity based at least in part on the comparison metric.

20. The non-transitory computer-readable storage medium of claim 15, wherein executing the instructions further causes the one or more processors to:

generate a trained generative model by training a generative model based at least in part on the set of new defined string objects;

receive, from a first camera of the group of cameras of a first edge device of the group of edge devices, an image of a visual element, wherein the visual element represents second handwritten information or second printed information;

generate an undefined string object based at least in part on the image of the visual element; and determine the undefined string object is associated with an anomaly based at least in part on providing the undefined string object to the trained generative model;

perform, based at least in part on the anomaly, at least one of:

cause transfer of a transferrable asset based at least in part on approving a transaction associated with the visual element, block transfer of the transferrable asset based at least in part on rejecting the transaction associated with the visual element, or trigger an operational alert associated with an account of the edge device.

* * * * *